US008234373B1

(12) United States Patent
Ulvenes

(10) Patent No.: US 8,234,373 B1
(45) Date of Patent: Jul. 31, 2012

(54) METHOD AND SYSTEM FOR MANAGING PAYMENT FOR WEB CONTENT BASED ON SIZE OF THE WEB CONTENT

(75) Inventor: Randy Ulvenes, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1414 days.

(21) Appl. No.: 10/694,429

(22) Filed: Oct. 27, 2003

(51) Int. Cl.
*G06F 15/173* (2006.01)

(52) U.S. Cl. ........ 709/225; 709/223; 709/224; 709/226; 709/246; 455/406; 455/556.2; 705/400

(58) Field of Classification Search ................. 709/225, 709/223, 224, 226, 246; 455/406, 556.2; 705/400

See application file for complete search history.

(56) References Cited

U.S. PATENT DOCUMENTS

| | | |
|---|---|---|
| 5,077,790 A | 12/1991 | D'Amico et al. |
| 5,708,780 A | 1/1998 | Levergood et al. |
| 5,764,188 A | 6/1998 | Ghosh et al. |
| 5,908,469 A | 6/1999 | Botz et al. |
| 5,930,777 A | 7/1999 | Barber |
| 5,933,498 A | 8/1999 | Schneck et al. |
| 5,961,593 A | 10/1999 | Gabber et al. |
| 6,029,141 A | 2/2000 | Bezos et al. |
| 6,035,281 A * | 3/2000 | Crosskey et al. ............ 705/14 |
| 6,037,935 A | 3/2000 | Bates et al. |
| 6,052,730 A | 4/2000 | Felciano et al. |
| 6,092,196 A | 7/2000 | Reiche |
| 6,101,510 A | 8/2000 | Stone et al. |
| 6,112,242 A | 8/2000 | Jois et al. |
| 6,121,970 A | 9/2000 | Guedalia |
| 6,122,520 A | 9/2000 | Want et al. |
| 6,134,680 A | 10/2000 | Yeomans |
| 6,161,185 A | 12/2000 | Guthrie et al. |
| 6,178,511 B1 | 1/2001 | Cohen et al. |
| 6,182,113 B1 | 1/2001 | Narayanaswami |
| 6,195,545 B1 | 2/2001 | Baker et al. |
| 6,199,077 B1 | 3/2001 | Inala et al. |

(Continued)

FOREIGN PATENT DOCUMENTS

WO WO 9843177 10/1998

(Continued)

OTHER PUBLICATIONS

Network Appliance, "Internet Content Adaptation Protocol (ICAP)," pp. 1-13, Jul. 30, 2001.

(Continued)

*Primary Examiner* — Ario Etienne
*Assistant Examiner* — Michael C Lai

(57) ABSTRACT

A method and system for providing advanced notice of cost to access web content, where the cost is computed based on the size of the web content. During transmission of web content over a communication path between a content server and a client station, an intermediation system may add into the web content, in conjunction with a hyperlink to referenced web content, an indication of size-based cost to access the referenced web content. Further, during transmission of a request for web content over a communication path from a client station to a content server, and/or during transmission of the web content over a communication path from a content server to a client station, the intermediation system may engage in interstitial communication with a user of the client station to obtain the user's agreement to pay the size-based cost.

8 Claims, 12 Drawing Sheets

U.S. PATENT DOCUMENTS

| | | | |
|---|---|---|---|
| 6,199,079 B1 | 3/2001 | Gupta et al. | |
| 6,202,087 B1 | 3/2001 | Gadish | |
| 6,233,608 B1 | 5/2001 | Laursen et al. | |
| 6,247,048 B1 | 6/2001 | Greer et al. | |
| 6,253,193 B1 | 6/2001 | Ginter et al. | |
| 6,266,681 B1 | 7/2001 | Guthrie | |
| 6,269,460 B1 | 7/2001 | Snover | |
| 6,311,215 B1 | 10/2001 | Bakshi et al. | |
| 6,317,718 B1 | 11/2001 | Fano | |
| 6,321,256 B1 | 11/2001 | Himmel et al. | |
| 6,353,839 B1 | 3/2002 | King et al. | |
| 6,377,810 B1 | 4/2002 | Geiger et al. | |
| 6,407,680 B1 | 6/2002 | Lai et al. | |
| 6,421,733 B1* | 7/2002 | Tso et al. | 709/246 |
| 6,434,614 B1 | 8/2002 | Blumenau | |
| 6,457,030 B1 | 9/2002 | Adams et al. | |
| 6,510,458 B1 | 1/2003 | Berstis et al. | |
| 6,510,464 B1 | 1/2003 | Grantges et al. | |
| 6,519,631 B1 | 2/2003 | Rosenschein et al. | |
| 6,526,335 B1 | 2/2003 | Treyz et al. | |
| 6,535,896 B2 | 3/2003 | Britton et al. | |
| 6,560,607 B1 | 5/2003 | Lassesen | |
| 6,582,474 B2 | 6/2003 | LaMarca et al. | |
| 6,590,588 B2 | 7/2003 | Lincke et al. | |
| 6,594,697 B1 | 7/2003 | Praitis et al. | |
| 6,640,098 B1 | 10/2003 | Roundtree | |
| 6,643,641 B1 | 11/2003 | Snyder | |
| 6,684,249 B1 | 1/2004 | Frerichs et al. | |
| 6,687,732 B1 | 2/2004 | Bector et al. | |
| 6,694,484 B1 | 2/2004 | Mueller | |
| 6,704,773 B1 | 3/2004 | Cohn et al. | |
| 6,721,780 B1 | 4/2004 | Kasriel et al. | |
| 6,826,597 B1 | 11/2004 | Lonnroth et al. | |
| 6,832,239 B1 | 12/2004 | Kraft et al. | |
| 6,871,197 B1 | 3/2005 | Johnson | |
| 6,874,018 B2 | 3/2005 | Wu | |
| 6,880,123 B1 | 4/2005 | Landsman et al. | |
| 6,892,181 B1 | 5/2005 | Megiddo et al. | |
| 6,910,068 B2 | 6/2005 | Zintel et al. | |
| 6,912,571 B1 | 6/2005 | Serena | |
| 6,918,090 B2 | 7/2005 | Hesmer et al. | |
| 6,925,288 B2 | 8/2005 | McDonnell et al. | |
| 6,925,485 B1 | 8/2005 | Wang et al. | |
| 6,928,291 B2 | 8/2005 | Yiu et al. | |
| 6,987,987 B1* | 1/2006 | Vacanti et al. | 455/556.2 |
| 7,080,158 B1 | 7/2006 | Squire | |
| 7,107,309 B1 | 9/2006 | Geddes et al. | |
| 7,146,403 B2 | 12/2006 | Tock et al. | |
| 7,210,094 B2 | 4/2007 | Dovin et al. | |
| 7,233,942 B2 | 6/2007 | Nye | |
| 7,277,924 B1 | 10/2007 | Wichmann et al. | |
| 7,310,516 B1 | 12/2007 | Vacanti et al. | |
| 7,360,160 B2 | 4/2008 | Matz | |
| 7,360,210 B1 | 4/2008 | Geddes | |
| 2001/0034771 A1 | 10/2001 | Hutsch et al. | |
| 2001/0035885 A1 | 11/2001 | Iron et al. | |
| 2002/0002602 A1 | 1/2002 | Vange et al. | |
| 2002/0007393 A1 | 1/2002 | Hamel | |
| 2002/0047859 A1 | 4/2002 | Szlam et al. | |
| 2002/0059396 A1 | 5/2002 | Holzer et al. | |
| 2002/0083013 A1 | 6/2002 | Rollins et al. | |
| 2002/0099738 A1 | 7/2002 | Grant | |
| 2002/0103712 A1 | 8/2002 | Rollins et al. | |
| 2002/0120564 A1 | 8/2002 | Strietzel | |
| 2002/0129064 A1 | 9/2002 | Guthrie | |
| 2002/0156732 A1 | 10/2002 | Odijk et al. | |
| 2002/0165925 A1 | 11/2002 | Hamilton, II et al. | |
| 2003/0002633 A1 | 1/2003 | Kredo et al. | |
| 2003/0018668 A1 | 1/2003 | Britton et al. | |
| 2003/0023634 A1 | 1/2003 | Justice et al. | |
| 2003/0032413 A1 | 2/2003 | Aksu et al. | |
| 2003/0055878 A1 | 3/2003 | Fletcher et al. | |
| 2003/0058271 A1 | 3/2003 | Van Der Meulen | |
| 2003/0065739 A1 | 4/2003 | Shnier | |
| 2003/0083041 A1* | 5/2003 | Kumar et al. | 455/406 |
| 2003/0110296 A1 | 6/2003 | Kirsch et al. | |
| 2003/0128229 A1* | 7/2003 | Colson et al. | 345/733 |
| 2003/0154171 A1 | 8/2003 | Karp et al. | |
| 2003/0177248 A1* | 9/2003 | Brown et al. | 709/229 |
| 2003/0187806 A1* | 10/2003 | Banerjee et al. | 705/400 |
| 2003/0233329 A1 | 12/2003 | Laraki et al. | |
| 2004/0059783 A1 | 3/2004 | Kazui et al. | |
| 2004/0088170 A1* | 5/2004 | Nakanishi et al. | 705/1 |
| 2004/0098470 A1* | 5/2004 | Kurihara | 709/219 |
| 2004/0203630 A1 | 10/2004 | Wang | |
| 2005/0044488 A1 | 2/2005 | d'Aquin | |
| 2005/0055422 A1 | 3/2005 | Campbell et al. | |
| 2005/0066012 A1 | 3/2005 | Campbell et al. | |
| 2005/0086298 A1 | 4/2005 | Campbell et al. | |
| 2005/0138432 A1 | 6/2005 | Ransom et al. | |
| 2005/0144557 A1 | 6/2005 | Li et al. | |
| 2006/0123478 A1 | 6/2006 | Rehfuss et al. | |
| 2006/0253411 A1 | 11/2006 | Roy-Chowdhury et al. | |
| 2008/0046415 A1 | 2/2008 | Henkin et al. | |

FOREIGN PATENT DOCUMENTS

| | | |
|---|---|---|
| WO | WO 03065678 | 8/2003 |

OTHER PUBLICATIONS

IBM, "Intermediaries: An Approach to Manipulating Information Streams," http://www.research.ibm.com/journal/sj/384/barrett.html, IBM Systems Journal, vol. 38, No. 4, 1999.

First USENIX Workshop on Electronic Commerce, Jul. 1995, Payment Switches for Open Networks, http://www.usenix.org/publications/library/proceedings/ec95/gifford.html, printed from the World Wide Web on Apr. 15, 2002.

USENIX, "Payment Switches for Open Networks," Proceedings of the First USENIX Workshop on Electronic Commerce, New York, New York, Jul. 1995, http://www.usenix.org/publications/library/proceedings/ec95/full_papers/gifford.txt, printed from the World Wide Web on Apr. 15, 2002.

Redknee, "Mobile Multimedia Gateway," http://www.redkneww.com/products/rk_pro_net_mobilemultimediagateway.php, printed from the World Wide Web on Apr. 15, 2002.

"Open Pluggable Edge Services (OPES)," http://www.ietf-opes.org/oldindex.html, printed from the World Wide Web on Apr. 15, 2002.

IBM, "Web Intermediaries (WBI)," http://www.almaden.ibm.com/cs/wbi/index.html, printed from the World Wide Web on Apr. 30, 2002.

IBM, "Plugins," http://www.almaden.ibm.com/cs/wbi/Plugins.html, printed from the World Wide Web on Apr. 30, 2002.

IBM, "WebPlaces: Adding People to the Web," http://www.almaden.ibm.com/cs/wbi/papers/www8/wwwplaces-abstract.html, printed from the World Wide Web on Apr. 30, 2002.

IBM, "WebSphere Edge Server—Product Overview—IBM Software," http://www-3.ibm.com/software/webservers/edgeserver/, printed from the World Wide Web on Sep. 3, 2002.

Bridgewater Systems, "Content Access Controller," http://www.bridgewatersystems.com/products/content_controller/?BSCID=d8f8772, printed from the World Wide Web on Sep. 3, 2002.

Identifying Web Users in a Proxy Server, U.S. Appl. No. 09/486,104 (Applicants do not have a patent application).

Extracting Contents of a Document During Delivery, U.S. Appl. No. 09/512,974 (Applicants do not have a patent application).

Secure Network Proxying, U.S. Appl. No. 09/512,975 (Applicants do not have a patent application).

Expediting the Retrieval of External Components Referenced in a Document, U.S. Appl. No. 09/512,976 (Applicants do not have a patent application).

Commercial Activity Performed in Conjunction with Document Retrieval, U.S. Appl. No. 09/512,977 (Applicants do not have a patent application).

Modifying Contents of a Document During Delivery, U.S. Appl. No. 09/513,217 (Applicants do not have a patent application).

A. Barbir et al., "An Architecture for Open Pluggable Edge Services (OPES)," Network Working Group, Internet-Draft, Aug. 2, 2002.

A. Barbir et al., "OPES Use Cases and Deployment Scenarios," Network Working Group, Internet-Draft, Aug. 5, 2002.

A. Beck et al., "Requirements for OPES Callout Protocols," Internet-Draft, Aug. 2, 2002.

A. Beck et al., "Example Services for Network Edge Proxies," Internet Draft, Nov. 21, 2000.

U.S. Appl. No. 10/190,380, filed Jul. 3, 2002 entitled "Method and System for Providing Advanced Notice of Cost to Access Web Content".

R. Fielding et al., "Hypertext Transfer Protocol—HTTP/1.1," Network Working Group, Request for Comments: 2616, Jun. 1999.

J. Pollock, "A Custom 404 Page" www.pagesource.com/zine/custom404.htm, Apr. 18, 1999.

4GuysFromRolla.com, "Creating a Custom 404 Error Page," publicly posted Apr. 21, 1999.

The Apache Foundation, "Custom Error Responses," Apache HTTP Server Version 1.3, documentation released Dec. 5, 2001.

Circadence Corporation, "Conductor QoSSM White Paper," Apr. 27, 2001.

Microsoft Computer dictionary, 1999, Microsoft Press, Fourth Edition, pp. 109 and 350.

The Java Community Process (SM) Program—JSRs: Java Specification Requests, JSR 168 Portlet Specification, http://www.jcp.org/en/jsr/detail?id=168&showPrint, printed from the World Wide Web on Dec. 5, 2002.

TechWeb: The Business Technology Network, http://content techweb.com/encyclopedia/defineterm?term=portlet, printed from the World Wide Web on Aug. 28, 2002.

e-docstea.com, WebLogic Portal 7.0, Administering Portal and Portlet Attributes, http:edocs.bea.com/wlp/docs70/admin/frmwork.htm, printed from the World Wide Web on Aug. 28, 2002.

Office action from U.S. Appl. No. 10/189,941, dated Aug. 14, 2006.
Office action from U.S. Appl. No. 10/189,941, dated Jun. 11, 2007.
Office action from U.S. Appl. No. 10/189,941, dated Nov. 28, 2007.
Office action from U.S. Appl. No. 10/189,941, dated Feb. 4, 2008.
Office action from U.S. Appl. No. 10/189,941, dated Mar. 28, 2008.
Office action from U.S. Appl. No. 10/189,941, dated Oct. 10, 2008.
Office action from U.S. Appl. No. 10/189,941, dated Dec. 30, 2008.
Office action from U.S. Appl. No. 10/190,380, dated Jan. 12, 2005.
Office action from U.S. Appl. No. 10/190,380, dated Jul. 27, 2005.
Office action from U.S. Appl. No. 11/266,438, dated Oct. 2, 2006.
Office action from U.S. Appl. No. 11/266,438, dated Mar. 7, 2007.

Wang et al., "Department of Computer Science, University College London, London WC1E 6BT, United Kingdom," 1996.

Padmanabhan et al., "Using Predictive Prefetching to Improve World Wide Web Latency," 1996.

Jacobson et al., "Potential and Limits of Web Prefetching Between Low-Bandwidth Clients and Proxies," 1998.

The List Preload Images, http://www.lists.evolt.org/archive/Week-of-mon-20020204/067827.html, Feb. 5, 2002.

exit.chm page printed from an archive of the Federal Highway Administration website, dated Jan. 27, 2000.

IBM, Location-based services, http://www-106.ibm.com/developerworks/ibm/library/I-lbs/, printed from the World Wide Web on May 23, 2003.

American Express Company 2001, http://www.26.americanexpress.com/ privatepayments/fag.jsp, printed from the World Wide Web on Oct. 17, 2002.

Thomason, Larisa, "Load Time Tip: Reuse, Optimize, and preload Images" http://www.netmechanic.com/news/vol_13/loadtime_no6.htm, vol. 3, No. 6, Jun. 2000.

Tong et al., Alleviating the Latency and Bandwidth Problems in WWW Browsing, http://www.usenix.org/publications/library/proceedings/usits97/full_papers/tong/tong_html, Oct. 26, 1997.

Jiang et al., "Web Prefetching in a Mobile Environment" IEEE Personal Communications, pp. 25-34, Oct. 1998.

Davison, "Predicting Web Actions from HTML Content" Jun. 15, 2002.

Duchamp, "Prefetching Hyperlinks" Usenix, Boulder, Colorado, Oct. 11-14, 1999.

Bestavros, Azer, "Speculative Data Dissemination and Service to Reduce Server Load, Network Traffic and Service Time in Distributed Information Systems" Mar. 1996.

Wcol, " WWW Collector Home Page", http://shika.aist-nara.ac.jp/products/wcol/wcolE.html, printed from the World Wide Web on Jul. 1, 2003.

Chinen, et al., "An Interactive Prefetching Proxy Server for Improvement of WWW Latency", http://www.isoc.org/inet97/proceedings/A1/A1_3htm, Jul. 3, 2003.

Burns, "So, You Want to Pre-Load, Hugh?", http://www.htmlgoodies.com/tutors/ preload.html, printed from the World Wide Web on Nov. 14, 2002.

Google Groups, "Lewis, Stephen, Newsgroup Message, dated Jul. 24, 2000", http://groups-beta.google.com/group/microsoft.public.webdesign.html.

Introduction to SSL, http://developer.netscape.com/docs/manuals/security/ sslin/contents.htm, Oct. 9, 1998.

Gerck, E., Ph.D., "Overview of Certification Systems: X.509, PKIX, CA, PGP & SKIP" Jul. 18, 2000.

Gerck, E., "Overview of Certification Systems: X.509, CA, PGP and SKIP" http://mcg.org.br/cert.htm, Apr. 17, 1997.

X.509, http://www.hsc.fr/resources/presentations/pki/img9.htm, 1999.

Trusted Computing Platform Alliance (TCPA), "Building a Foundation of Trust in the PC" Jan. 2000.

Carroll, Amy; Juarez, Mario; Polk, Julia and Leininger, Tony, "Microsoft "Palladium": A Business Overview", http://www.microsoft.com/presspass/features/2002/juL02/0724palladiunnwp.asp, Jan. 25, 2003.

Anderson, Ross., "TCPA / Palladium Frequently Asked Questions", Version 1.0. http://www.cl.cam.ac.uk/~rja14/tcpa-faq.html, Jan. 16, 2003.

Internet Explorer SSL Vulnerability, http://www.thoughtcrime.org/ie-ssl-chain.txt, Aug. 5, 2002.

ZDNet: Tech Update: Enterprise Application/Single Sign-on Battle Looms, http://techupdate.zdnet.com/techupdate/stories/main/0,14179,2824248,00.html, printed from the World Wide Web on Feb. 19, 2002.

Introduction to Single Sign-On, http:www.opengroup.org/security/sso/sso_intro.htm, printed from the World Wide Web on Feb. 19, 2002.

Novell: Novell SecureLogin, http://www.novel.com/source/printer_friendly/ qI20017_en.html, printed from the World Wide Wide Web on Feb. 19, 2002.

Novell: Novell SecureLogin, http://www.novel.com/source/printer_friendly/ qI20017_en.html, printed from the World Wide Web on Feb. 19, 2002.

U.S. Appl. No. 10/128,828, filed Apr. 24, 2002.
U.S. Appl. No. 10/189,941, filed Jul. 3, 2002.
U.S. Appl. No. 10/189,937, filed Jul. 3, 2002.
U.S. Appl. No. 10/189,892, filed Jul. 3, 2002.
U.S. Appl. No. 10/190,362, filed Jul. 3, 2002.

* cited by examiner

1. Article #1
2. Article #2
3. Article #3
4. Article #4

Fig. 11

1. <A HREF="http://www.newsmagazine.com/article0001.htm">Article # 1</A><BR>
2. <A HREF="http://www.newsmagazine.com/article0002.htm">Article # 2</A><BR>
3. <A HREF="http://www.newsmagazine.com/article0003.htm">Article # 3</A><BR>
4. <A HREF="http://www.newsmagazine.com/article0004.htm">Article # 4</A><BR>

Fig. 12

| MARKUP-PATTERN | SIZE | ACTION |
|---|---|---|
| <A HREF="http://www.newsmagazine.com/article0001.htm"> | 14 | ADDCOST(COMPCOST(size)) |
| <A HREF="http://www.newsmagazine.com/article0002.htm"> | 8 | ADDCOST(COMPCOST(size)) |
| <A HREF="http://www.newsmagazine.com/article0003.htm"> | 20 | ADDCOST(COMPCOST(size)) |
| <A HREF="http://www.newsmagazine.com/article0004.htm"> | 16 | ADDCOST(COMPCOST(size)) |

Fig. 13

1. <A HREF="http://www.newsmagazine.com/article0001.htm">Article # 1</A> ($2.52)<BR >
2. <A HREF="http://www.newsmagazine.com/article0002.htm">Article # 2</A> ($1.44)<BR>
3. <A HREF="http://www.newsmagazine.com/article0003.htm">Article # 3</A> ($3.60)<BR>
4. <A HREF="http://www.newsmagazine.com/article0004.htm">Article # 4</A> ($2.88)<BR>

Fig. 14

1. <u>Article #1</u> ($2.52)
2. <u>Article #2</u> ($1.44)
3. <u>Article #3</u> ($3.60)
4. <u>Article #4</u> ($2.88)

| URI-PATTERN | SIZE | ACTION |
|---|---|---|
| www.newsmagazine.com/article0001.htm | 14 | INTERSTITIAL-BILLING(COMPCOST(size)) |
| www.newsmagazine.com/article0002.htm | 8 | INTERSTITIAL-BILLING(COMPCOST(size)) |
| www.newsmagazine.com/article0003.htm | 20 | INTERSTITIAL-BILLING(COMPCOST(size)) |
| www.newsmagazine.com/article0004.htm | 16 | INTERSTITIAL-BILLING(COMPCOST(size)) |

Fig. 17

| URI-PATTERN | SIZE | REQUEST ACTION | RESPONSE ACTION |
|---|---|---|---|
| www.newsmagazine.com/article0001.htm | 14 | INTERSTITIAL-BILLING(COMPCOST(size)) | ADDCOST(COMPCOST(size)) |
| www.newsmagazine.com/article0002.htm | 8 | INTERSTITIAL-BILLING(COMPCOST(size)) | ADDCOST(COMPCOST(size)) |
| www.newsmagazine.com/article0003.htm | 20 | INTERSTITIAL-BILLING(COMPCOST(size)) | |
| www.newsmagazine.com/article0004.htm | 16 | | ADDCOST(COMPCOST(size)) |

METHOD AND SYSTEM FOR MANAGING PAYMENT FOR WEB CONTENT BASED ON SIZE OF THE WEB CONTENT

BACKGROUND

1. Field of the Invention

The present invention relates to network communications and more particularly to mechanisms for managing and controlling the delivery of web content (e.g., web pages, objects, files, applications, etc.)

2. Description of Related Art

In recent years, the Internet and the world wide web have become ubiquitous. The sheer volume of information and services available at any time via the Internet is astounding. As such, users often turn to the Internet to communicate with others, to receive current news reports, to shop, to be entertained, and for assorted other reasons.

As its name implies, the Internet is a network of computer networks. The world wide web is, in turn, an application that runs on the Internet, powered by web servers and web browsers. A web server stores or has access to "web pages" made up of various objects (e.g., text, graphics, audio, video or other media and logic) and can send the pages to web browsers that access the server via hypertext transfer protocol (HTTP) or another agreed protocol.

A web page is usually defined by a set of markup language, such as hypertext markup language (HTML), wireless markup language (WML), handheld device markup language (HTML), extensible hypertext markup language (XHTML) or compact HTML (cHTML) for instance. The markup language typically specifies text to be displayed and includes tags that direct the browser to carry out various functions. For instance, a tag can direct the browser to display text in a particular manner. Or a tag can direct the browser to request and load other objects, such as images or sound files, to be presented as part of the web page. Or as another example, a tag can direct the browser to display a hyperlink that points to another web page or object (or generally referencing any other web content).

(Note that markup language could take other forms as well. As one other example, for instance, a markup language such as voice extensible markup language (VXML) could include voice-tags that direct a browser to play out speech messages to a user. In that event, the client station might be a voice command platform with which a user communicates via a telephone link. Still other examples are also possible.)

A user operating a web browser on a client station can direct the web browser to navigate to a particular web page or to load other web content. To do so, the user may select or enter into the browser a universal resource identifier (URI), typically a universal resource locator (URL), which points to a host web server, usually by a domain name, and identifies the requested content, usually by a path and filename. In response, the browser will then generate and send to the web server an HTTP "GET" request message, which indicates the URI. When the server receives the GET request, if the requested content is available, the server will then respond by sending to the browser an HTTP "200 OK" response message that includes the requested content. And when the browser receives the HTTP response, the browser will then present the content to the user.

As is well known, Internet communications occur through a defined set of protocol layers, including an application layer, a transport layer, a network layer and a physical layer. Applications, such as a web browser and a web server, communicate with each other according to an application layer protocol, such as HTTP. And those communications are then arranged as data packets, which are passed between the applications according to a transport layer protocol such as TCP and between network nodes according to the network layer IP protocol. Each packet typically bears a TCP/IP header, which indicates source and destination IP addresses as well as source and destination TCP ports associated with the respective applications.

In order for a web client to engage in HTTP communication with a web server, the client and server will first establish a TCP "socket" or "connection" between each other. The client then sends an HTTP GET request in the TCP socket, typically through one or more routers, switches and/or proxies, to the IP address of the server. And the server responds by sending a 200 OK response in the TCP socket to the LP address of the client.

Alternatively, the web client may open up a first TCP socket with a designated proxy server, an the proxy may open up a second TCP socket with the web server. The web client may then send an HTTP GET request in the first TCP socket to the proxy, and the proxy may then send the HTTP GET request in the second TCP socket to the IP address of the web server. In turn, the web server may send a 200 OK response in the second TCP socket to the proxy, and the proxy may then send the 200 OK response in the first TCP socket to the IP address of the web client.

SUMMARY

An exemplary embodiment of the present invention provides a mechanism for giving a user advanced notice of cost to access web content, based at least in part on the size of the web content.

In one respect, for instance, the exemplary embodiment may take the form of a method that involves, during transmission of web content within a communication path between a content server and a client station, adding into the web content, in conjunction with a hyperlink to referenced web content, an indication of cost to access the referenced content, where the cost is a function of the size of the web content. That way, the indication will be presented to a user when the web content is presented to the user, thereby giving the user an advanced notice of the cost to access to the referenced web content.

In another respect, the exemplary embodiment may take the form of a method that involves, during transmission of a request for web content between a client station and a content server, (i) receiving the request, (ii) determining a cost of the web content based on the size of the web content, and (iii) engaging in interstitial communication with the client station to receive user approval to pay the determined cost (i.e., user approval to pay, or agreement to pay, or agreement to be billed, or the like). Given user approval, the method may then involve sending the request along the way to the destination content server.

Alternatively, the exemplary method may involve, during transmission of requested web content from a content server to a client station, (i) receiving the web content, (ii) determining a cost of the web content based on a size of the web content, and (iii) engaging in interstitial communication with the client station to receive user approval to pay the determined cost. Given user approval, the method may then involve sending the web content along the way to the client station.

In yet another respect, the exemplary embodiment may take the form of an intermediation system located within a web communication path between a client station and a content server (such as within an access channel). The intermediation system may include a network interface for receiving and sending communications on the web communication path, and the network interface may receive a communication that carries web content including a hyperlink that points to referenced web content. The intermediation system may then further include cost-embellishment logic for (i) determining a cost to access the referenced web content based on a size of the referenced web content and (ii) inserting into the web content an indication of determined cost and thereby establishing cost-embellished web content. In turn, the network interface may send the cost-embellished web content along the web communication path for ultimate receipt and presentation of the cost-embellished web content by a browser running on the client station.

In still another respect, the exemplary embodiment may take the form of an intermediation system located within a web communication path between a client station and a content server. The intermediation system may include a network interface for receiving and sending communications on the web communication path, and the network interface may receive a communication that carries a request from the client station for web content. The intermediation system may then further include (i) cost-calculation logic for determining a cost to access the referenced web content based on the size of the web content and (ii) interstitial communication logic for communicating with the client station so as to receive user approval to pay the determined cost. Given user-approval, the network interface may then send the request for web content along to the content server.

Alternatively or additionally, the exemplary embodiment may take the form of an intermediation system located within a web communication path between a client station and a content server. The intermediation system may include a network interface for receiving and sending communications on the web communication path, and the network interface may receive a communication that carries web content being delivered from the content server to the client station. The intermediation system may then further include (i) cost-calculation logic for determining a cost of the web content based on the size of the web content and (ii) interstitial communication logic for communicating with the client station so as to receive user approval to pay the determined cost. Given user-approval, the network interface may then send the web content along to the client station.

These as well as other aspects and advantages will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which:

FIG. 11 is an exemplary illustration of hyperlinks that may be set forth in a web page displayed at a client station;

FIG. 12 is a source code listing, depicting markup language that may underlie the hyperlinks shown in FIG. 11;

FIG. 13 is a partial illustration of a markup-pattern table, depicting records that an exemplary intermediation system may reference in order to trigger addition of size-based cost information to web content;

FIG. 14 is a source code listing, depicting the markup language of FIG. 12, modified to produce an indication of size-based cost next to each hyperlink;

FIG. 15 is an exemplary illustration of hyperlinks embellished with size-based cost information pursuant to the exemplary embodiment;

FIG. 16 is a partial illustration of a URI-pattern table, depicting records that an exemplary intermediation system might reference in order to trigger interstitial billing; and FIG. 17 is a partial illustration of a URI-pattern table, depicting records that an exemplary intermediation system may reference to trigger interstitial billing during a web request and to trigger embellishment with sized-based cost information during a web response.

DETAILED DESCRIPTION OF EXEMPLARY EMBODIMENT

1. Exemplary Base Network Architecture

As a general matter, an exemplary embodiment of the present invention provides an intermediation system for network communications, and more particularly for web communications. The intermediation system preferably sits within a web communication path between a client station and a content server, so that it can detect and act on web communications that pass between the client and the server.

The web communication path between the client station and the content server can take various forms. Generally speaking, it is the path along which a request for web content passes from the client station to the content server and along which a response to the request passes from the content server to the client station. (Alternatively, separate web communication paths could exist for the request and response.)

The web communication path can be an HTTP communication path, and the web communications could be HTTP messages. However, the path and communications could take other forms as well, complying with any desired protocol. For purposes of example only, this description will refer to HTTP communication paths and HTTP communications.

In practice, a request for web content could be carried by a single HTTP request message that is sent from the client station to the content server. Or the request for web content could be carried in multiple HTTP request messages, such as one that is sent from the client station to an intermediate point (e.g. proxy, portal, etc.) and another that is then sent from the intermediate point to the content server, for instance. Similarly, the requested web content could then be carried in an HTTP response message that is sent from the content server to the client station. Or the content could be carried in multiple HTTP response messages, such as one that is sent from the content server to an intermediate point and another that is then sent from the intermediate point to the client station, for instance. Additional steps could exist as well.

Figure 1:
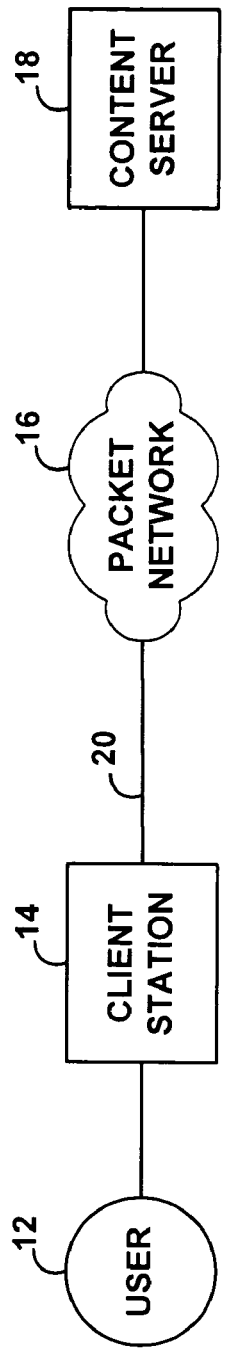
FIG. 1 is a block diagram showing an exemplary web communication path between a client station and content server.

Referring to the drawings, FIG. 1 depicts an exemplary HTTP communication path between a client station 14 and a content server 18. It should be understood, however, that this and other arrangements described herein are set forth for purposes of example only. As such, those skilled in the art will appreciate that other arrangements and other elements (e.g., machines, interfaces, functions, orders of functions, etc.) can be used instead, and some elements may be omitted altogether. Further, as in most telecommunications applications, those skilled in the art will appreciate that many of the elements described herein are functional entities that may be implemented as discrete or distributed components or in conjunction with other components, and in any suitable combination and location.

Still further, various functions described herein as being performed by one or more entities may be carried out by hardware, firmware and/or software logic. For instance, various functions may be carried out by a processor executing a set of machine language instructions stored in memory. Provided with the present disclosure, those skilled in the art can readily prepare appropriate computer instructions to perform such functions.

As shown in FIG. 1, client station 14 and content server 18 are linked together by a packet-switched network (or generally "data network") 16. More particularly, client station 14 communicates on an access channel 20, which provides the client station with connectivity to the packet-switched network 16. (I.e., the client station is communicatively linked via the access channel to the packet-switched network.) And content server 18 sits on the packet-switched network 16 or is otherwise accessible via the packet-switched network. (I.e., the content server is communicatively linked with the packet-switched network.) Thus, HTTP communications between client station 14 and content server 18 pass over a communication path that includes access channel 20 and packet-switched network 16. (Note that the access channel itself can comprise one or more links, whether circuit-switched and/or packet-switched.)

In this general arrangement, a browser running on client station 14 may generate an HTTP GET request, seeking web content from content server 18. The client station may then open a TCP socket with content server 18 and send the GET request through access channel 20 and packet-switched network 16 to the IP address of content server 18. Upon receipt of the request, the content server 16 may then generate an HTTP 200 OK response that carries markup language defining the requested content. And the content server may send the 200 OK response through packet-switched network 16 and access channel 20 to the IP address of the client station 14. Ultimately upon receipt of the response, the client station 14 may then present the content to a user 12.

Figure 2:
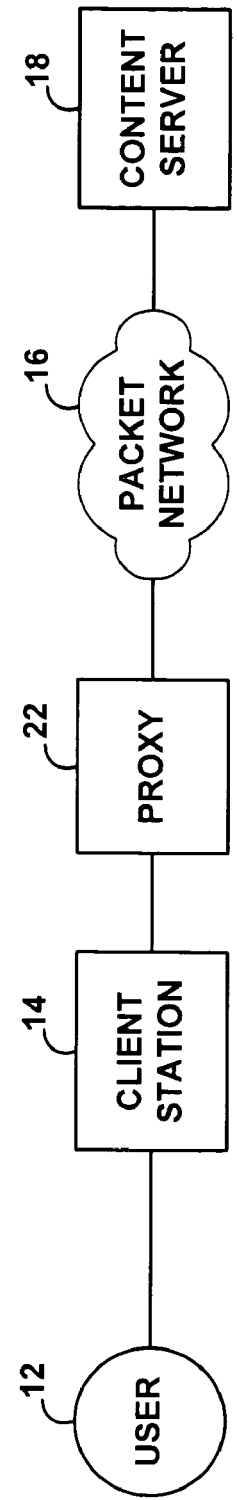
FIG. 2 is a block diagram showing an exemplary web communication path that includes a proxy.

Referring next to FIG. 2, a variation on the arrangement of FIG. 1 is shown. In FIG. 2, a proxy server 22 is added within the HTTP communication path between the client station 14 and the content server 18. In the figure, the proxy sever 22 is located within the access channel 20 between the client station 14 and the packet-switched network 16. However, the proxy server 22 could instead reside elsewhere in the HTTP communication path, such as elsewhere on packet-switched network 16 for instance. Further, multiple proxy servers could be provided.

In the arrangement of FIG. 2, a request for web content still passes along the HTTP communication path from the client station 14 to the content server 18. However, in this arrangement, separate TCP sockets may exist between the client station 14 and proxy server 22 on one hand and the proxy server 22 and content server 18 on the other hand. Thus, the communication path carries a request for web content in an HTTP GET request from the client station 14 to the proxy server 22 and then in another HTTP GET request from the proxy server 22 to the content server 18. And the communication path carries the requested web content in an HTTP 200 OK response from the content server 18 to the proxy server 22 and then in another HTTP 200 OK response from the proxy server to the client station.

Alternatively, proxy server 22 may be a transparent proxy, which does not itself establish TCP sockets with the two endpoints but instead just forwards HTTP messages to their destinations. Thus, for instance, if the client station 14 opens a TCP socket with the content server 18, the client station 14 may send an HTTP GET request to the content server 18, via the proxy server 22. And the content server 18 may send an HTTP 200 OK response to the client station 14, via the proxy server 22.

Figure 3:
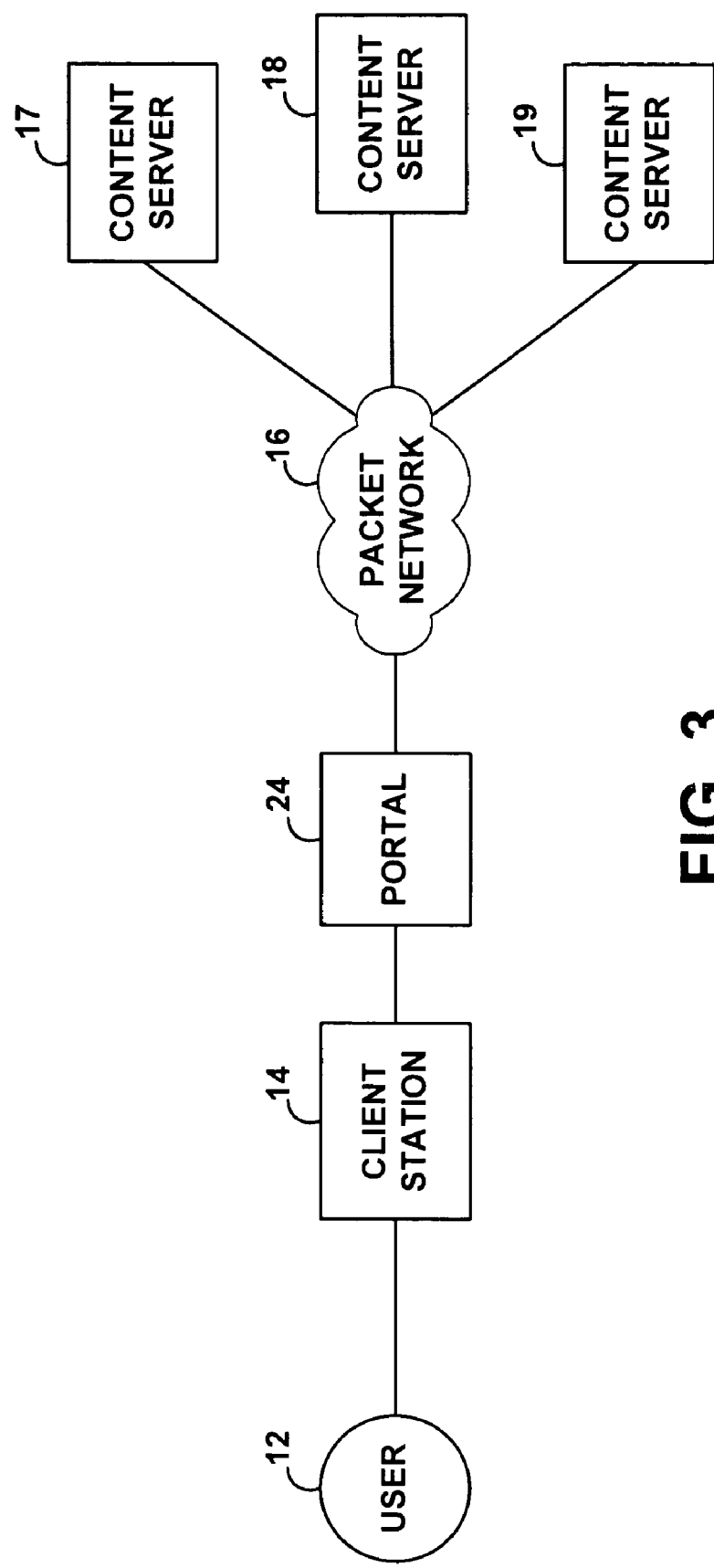
FIG. 3 is a block diagram showing an exemplary web communication path that includes a web portal.

Referring next to FIG. 3, another variation on the arrangement of FIG. 1 is shown. In FIG. 3, a web portal 24 has been added within the HTTP communication path between the client station 14 and the content server 18. Like proxy server 22 in FIG. 2, this portal 24 is shown in the access channel 20 between the client station 14 and the packet-switched network 16. But the portal 24 could reside elsewhere in the HTTP communication path.

As is well known, a web portal is effectively a web server itself, although it may get its web content from one or more content servers, typically aggregating or visually integrating the content together in respective frames or other "portlets" (e.g., as components of a single web page). For this reason, FIG. 3 illustrates multiple content servers 17, 18, 19 on packet-switched network 16.

In the arrangement of FIG. 3, a request for web content again still passes along the HTTP communication path between the client station 14 and content server 18. However, in usual practice, the request passes as an HTTP GET request from the client station to an IP address of the web portal 24, rather than to an IP address of the content server 18. Upon receipt of the request, the portal 24 may then establish a TCP socket respectively with each of the content servers 17, 18, 19 (or at least with one of them) and send to each content server an HTTP GET request seeking web content for a particular portlet. Each of the content severs 17, 18, 19 may then send a 200 OK response message to the portal 24, providing a respective subset of web content. And the portal 24 may then aggregate the subsets of web content together to form a single set of web content. The portal may then send a 200 OK response to the client station 14, providing the aggregated web content, i.e., the content from each of the underlying content servers 17, 18, 19.

Alternatively, it is possible that portal 24 may have already received and cached (stored) certain web content that the portal will use in various portlets. In that event (assuming the content has not expired), the portal 24 would not need to request the content from a content server in response to a GET request from the client station 14. But the effect is as though the portal does so, since the portal provides the client station with web content from a content server, in response to a GET request from the client station.

With the inclusion of a portal, an HTTP communication path may still be said to extend between the client station 14 and the content server 18, since a request for web content (by or on behalf of the client station 14) is sent to the content server 18, and web content is then transmitted from the content server 18 for ultimate receipt and presentation by the client station 14, albeit through the portal.

It should be understood that the arrangements shown in FIGS. 1-3 are representative of many possible communication systems, including many possible HTTP communication paths between a client station and a content server. In this regard, for instance, two of the variables in the system are the client station 14 and the access channel 20, each of which can take a variety of forms.

Figure 4:
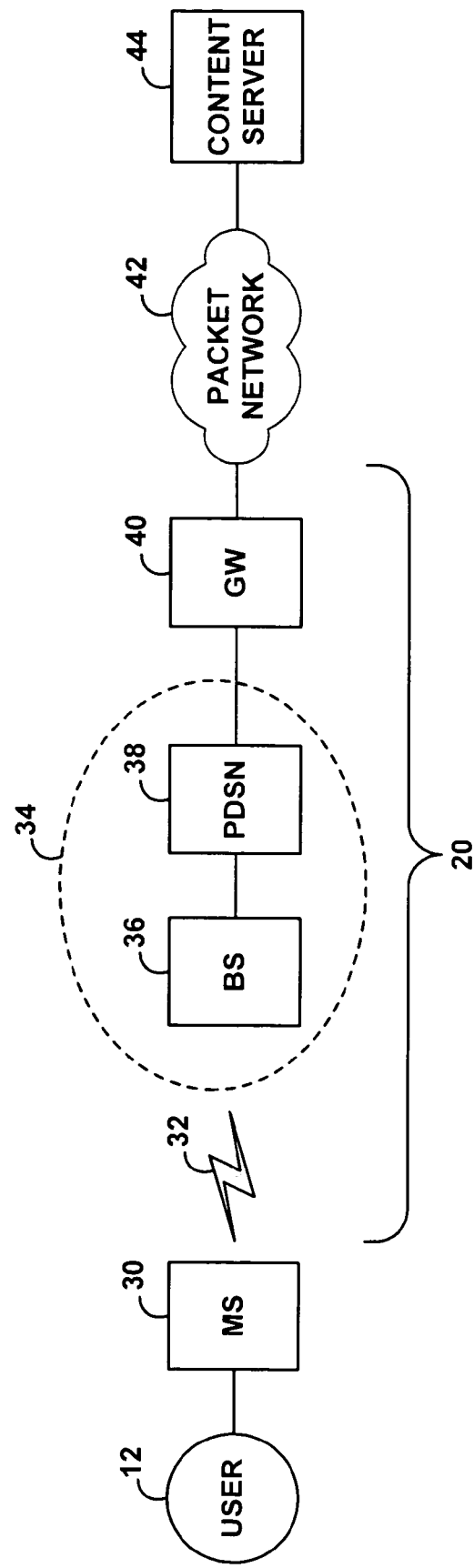
FIG. 4 is a block diagram showing an exemplary web communication in a wireless communication system.
Figure 5:
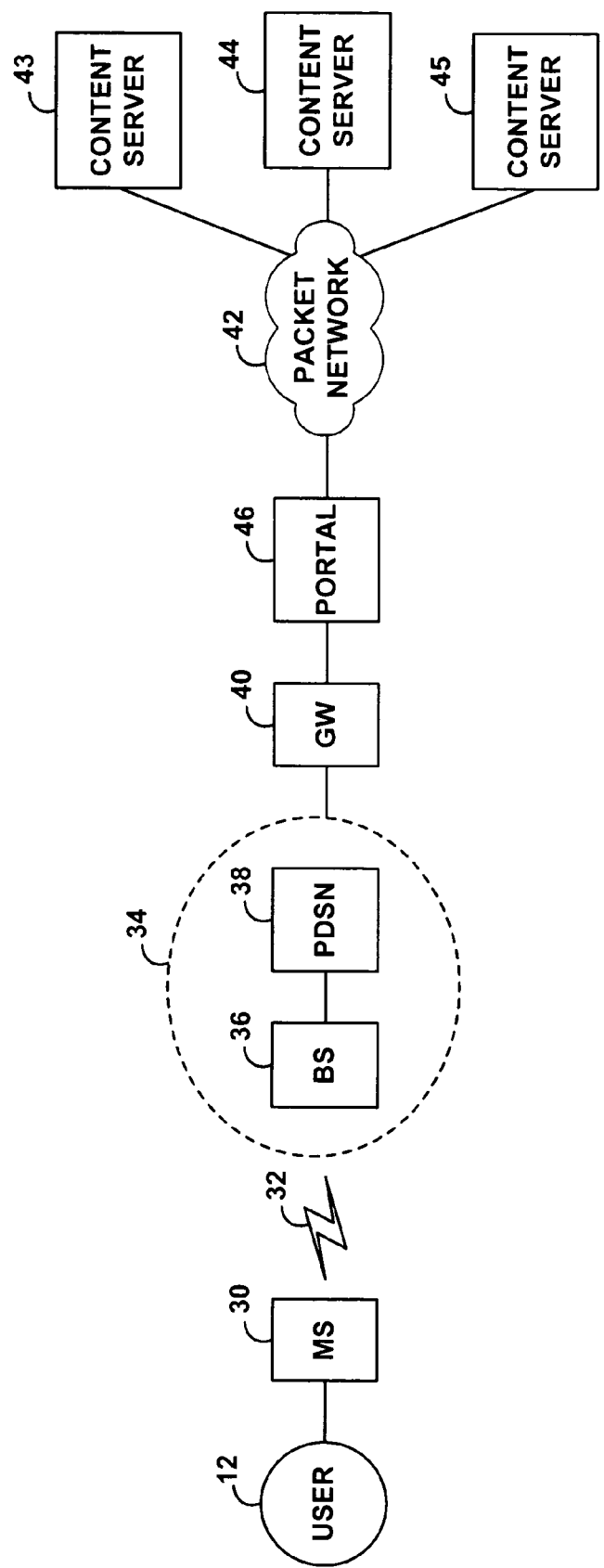
FIG. 5 is a block diagram showing an exemplary web communication path in a wireless communication system, including a portal within an access channel.
Figure 6:
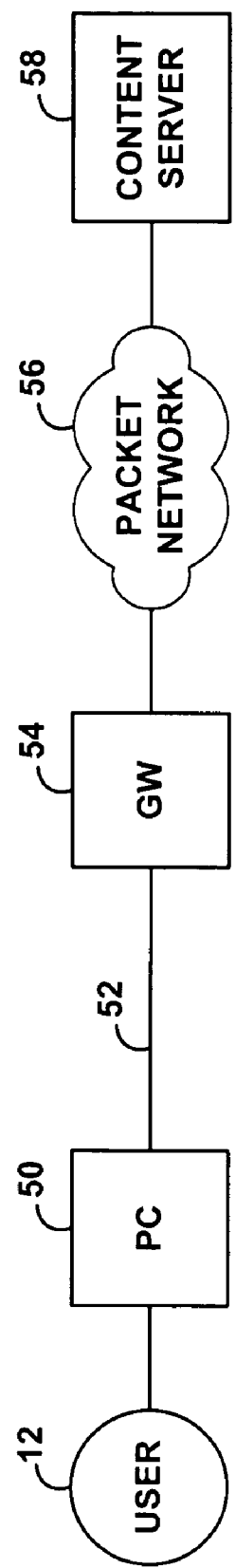
FIG. 6 is a block diagram showing an exemplary web communication path in a landline communication system.

As one example, for instance, the client station 14 could be a landline personal computer or other landline device, and the access channel 20 could include a local area network. And as another example, the client station could be a wireless terminal such as a 3G mobile station, and the access channel could then comprise a radio access network. (Note that the term "mobile station" generally refers to a wireless terminal. Notwithstanding the term "mobile," it is possible that a "mobile station" could be either a fixed wireless terminal or a mobile wireless terminal.) FIGS. 4-6 depict some more specific arrangements to help further illustrate these possible HTTP communication paths.

Referring to FIG. 4, an example wireless communication system is shown. In this example, the client station is a 3G mobile station 30, which communicates over an air interface 32 with a radio access network 34. (The radio access network 34 is shown to include a base station 36, which controls air interface communications with the mobile station, and a packet data serving node (PDSN) 38, which provides packet-switched network connectivity. But the radio access network could take other forms instead.) Radio access network 34 is then coupled via a gateway 40 to a packet-switched network 42. And a content server 44 sits on the packet-switched network.

In this arrangement, the access channel 20 between the client station 14 and the packet-switched network 42 includes the air interface 32, the radio access network 34, and the gateway 40. In this regard, the air interface might carry wireless communications in compliance with any radio communication protocol, such as CDMA, TDMA, GSM/GPRS, EDGE, UMTS, 802.11 (e.g., 802.11a/b), or Bluetooth, for instance. This description will consider CDMA by way of example.

According to existing 3G CDMA protocols, the mobile station 30 and PDSN 38 can establish a point-to-point protocol (PPP) data link, over which packet data can pass between the mobile station 30 and the packet-switched network 42. Further, the mobile station may have an assigned IP address and may communicate through a mobile-IP home agent (not shown), to facilitate mobility.

An exemplary 3G mobile station may be a handheld device such as a cellular or PCS telephone or personal digital assistant (e.g., Palm or Pocket-PC type device) for instance. As such, the mobile station will likely have a relatively small display screen. Additionally, because the display screen will likely be too small to display full size HTML pages, the mobile station will likely be equipped with a "microbrowser," which is a web browser tailored to present web content on a smaller handset display. An exemplary microbrowser is the Openwave™ Mobile Browser available from Openwave Systems Inc., which can be arranged to provide mobile information access through compliance with the industry standard Wireless Application Protocol (WAP) as well as various markup languages such as HDML, WML, XHTML, and cHTML.

If the mobile station 30 is a handheld device running a microbrowser, gateway 40 might function as a WAP gateway, to transcode web content being sent from content server 44 to mobile station 30, so as to put the web content and HTTP signaling into a form suitable for reference by the microbrowser (if not already). Alternatively, gateway 40 could function merely as a proxy, particularly where web content being sent to the mobile station is already in a form suitable for interpretation and presentation by the microbrowser.

Additionally, gateway 40 can function to inject into an HTTP request from mobile station 30 a user ID that can be used by downstream entities (such as content server 44, for instance) to provide user-specific functionality. In this regard, gateway 40 could maintain or otherwise have access to information that correlates user ID to session ID, so that the gateway can determine what user ID to insert for an HTTP communication from a given mobile station 30 (user 12).

Alternatively, the mobile station 30 could be a more full scale computing platform, such as a desktop or notebook personal computer, equipped with a wireless communication interface to facilitate communication over air interface 32 and through radio access network 34. (For instance, the personal computer could be linked (wirelessly or through a pin-out port or other connection) to a 3G handheld device, or the personal computer could include a plug-in card (e.g., PCI card or PCMCIA such as the AirCard® available from Sierra Wireless, Inc.) that provides for wireless communication.) In that event, the mobile station might have a more full scale web browser such as Microsoft Internet Explorer® or Netscape Navigator® for instance, which can conventionally receive and interpret HTML web content.

In the arrangement shown in FIG. 4, an HTTP communication path exists between mobile station 30 and content server 44. Thus, mobile station 30 may send an HTTP request (or equivalent request) for web content to content server 44, and content server 44 may respond by sending the requested web content to the mobile station 30. Mobile station 30 may then present the content to a user 12.

In an alternative arrangement, note that gateway 40 could sit on a core packet network (not shown) that resides between the radio access network 34 and the packet network 42. The core packet network could be a private IP network operated by the wireless carrier. And packet network 42 may then be a public packet network such as the Internet. (Alternatively, the networks could take other forms.) Further, it is also possible that content server 44 might reside on the core packet network rather than on the public packet network 42.

Referring next to FIG. 5, a variation on the arrangement of FIG. 4 is now shown. Similar to FIG. 3, this figure introduces a web portal in the access channel between the client station (mobile station 30) and the packet-switched network. Additionally, this figure shows several content servers 43, 44, 45 on the packet-switched network 42. Thus, similarly, an HTTP communication path still exists between the mobile station 30 and content server 44. However, the mobile station may send a request for web content to the portal 46, instead of to a content server. And the portal may then aggregate content from the one or more content servers 43, 44, 45, and provide the aggregated content to the mobile station in an HTTP response.

In this arrangement, the web portal 46 functions as described above, to aggregate web content in various portlet containers of a single web page. In this regard, if the mobile station 30 is a handheld device with a small display screen, it is possible that only one (or part of one) portlet will appear on the display screen of the mobile station at a time. (According to the HDML markup protocol, for instance, the portlets might be provided as separate "cards" (akin to pages), and a group of cards could be sent to the mobile station as a deck. Other arrangements are also possible.) In that case, a user of the mobile station may have to navigate from portlet to portlet. Alternatively, the user may be able to view the entire portal page at once, possibly by scrolling horizontally and vertically through the page.

Referring next to FIG. 6, another example communication system is shown, in this case a landline communication system. By way of example, the client station in the landline communication system is shown to be a personal computer (PC) 50, which communicates over a landline link 52 with a gateway 54 to a packet-switched network 56. A content server 58 then sits on the packet-switched network 56.

In this arrangement, the landline link 52 and gateway could take various forms. For example, link 52 could be a local area network (LAN), and gateway 54 could be a LAN server that is coupled to a backbone of packet-switched network 56. And as another example, link 52 could be a dial-up connection over the public switched telephone network (PSTN), and gateway 54 could be a network access server (NAS) that provides connectivity with the packet-switched network 56. Suitable network access servers are the Total Control network access server, available from UTStarcom Incorporated, of Alameda, Calif., and the Shasta Broadband Service Node, available from Nortel Networks, of Ontario, Canada. Such servers could be implemented to function as internet service provider (ISP) modem banks in a manner well known in the art.

As in the arrangements described above, an HTTP communication path can exist in this arrangement between the client station 50 and the content server 58. The HTTP communication path in this arrangement includes the landline link 52, the gateway 54 and the packet-switched network 56. Thus, a web browser running on personal computer 50 could generate and send to content server 58 an HTTP request seeking designated web content, and content server 58 could return an HTTP response providing the requested content. The web browser on personal computer 50 could then present the content to a user 12.

Although not illustrated, many variations on this landline arrangement are possible as well. For instance, just as in the general arrangement depicted in FIG. 3 and in the wireless arrangement depicted in FIG. 5, a web portal could sit within the HTTP communication path between the client station (personal computer 50) and one or more content servers. And the user 12 of the personal computer 50 could then navigate to the portal web page so as to load web content aggregated from multiple content servers.

More generally, it should be understood that many variations on the arrangements shown in FIGS. 1-6 are possible, and an HTTP communication path can take various forms. Requests for web content can pass over a variety of different paths between a client station and a content server. And the requested web content can then pass over a variety of different paths between the content server to the client station.

2. Overview of Exemplary Intermediation System a. Placement of Intermediation System within HTTP Communication Path As noted above, an exemplary intermediation system will sit within the HTTP communication path between a client station and content server. In this regard, the intermediation system will preferably include trigger logic, which detects HTTP communications, and enforcement logic, which acts on or in response to HTTP communications. In the exemplary embodiment, the intermediation system will be considered to sit within the HTTP communication path, as long as at least its trigger logic sits within the HTTP communication path. Some or all of the enforcement logic could then also lie within the HTTP communication path or could lie elsewhere and can be invoked as appropriate to carry out various intermediation functions.

Figure 7:
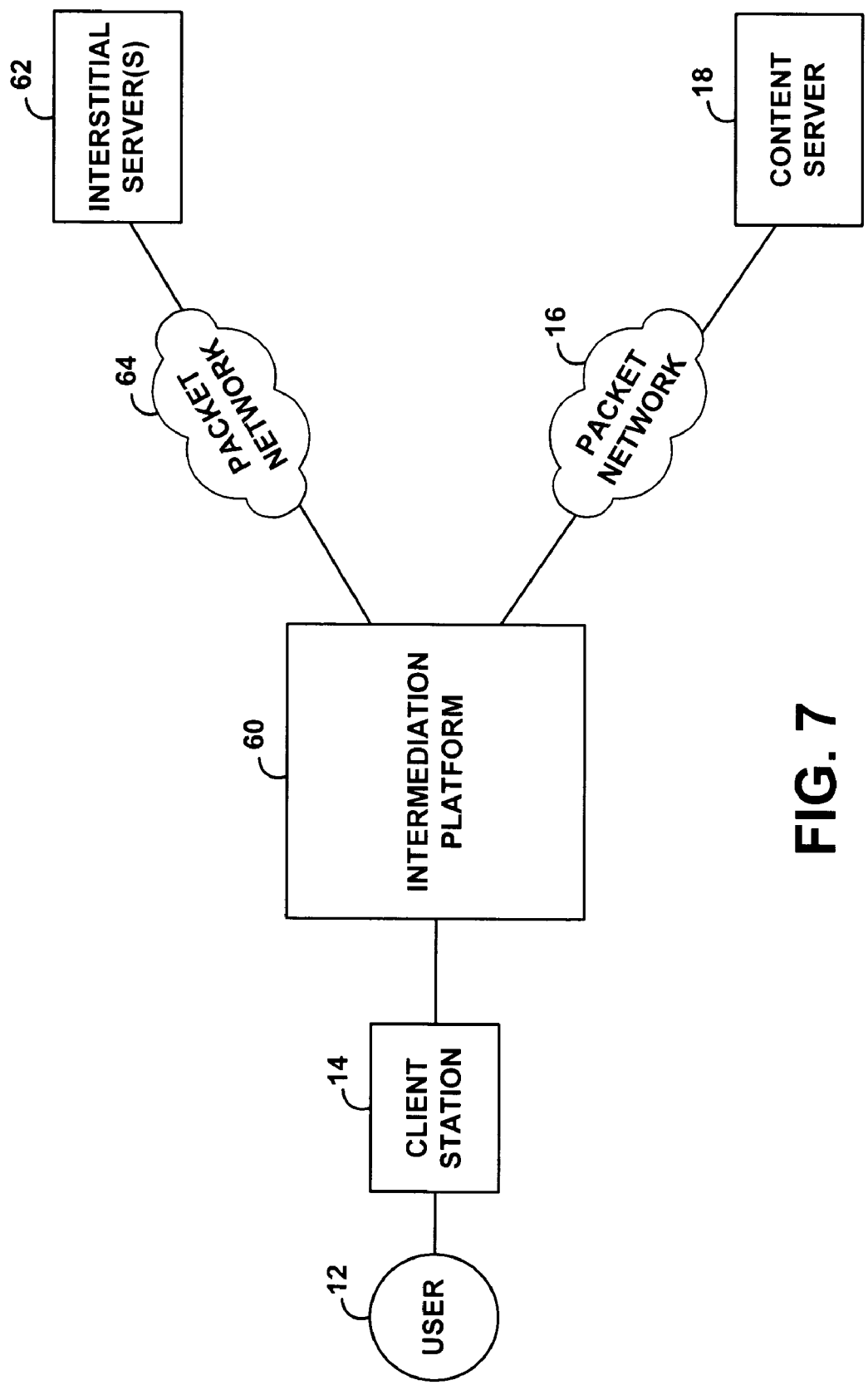
FIG. 7 is a block diagram showing placement of an intermediation system within web communication path, in accordance with the exemplary embodiment.

Referring now to FIG. 7, a variation of FIG. 1 is shown, to help illustrate the arrangement of an exemplary intermediation system. In FIG. 7, as in FIG. 1, a client station 14 communicates with a content server 18 over a packet-switched network 16, so that an HTTP communication path exists between the client station 14 and the content server 18.

As further shown, an intermediation platform 60 has then been inserted within that HTTP communication path. In particular, the intermediation platform 60 has been inserted within the access channel 20 between the client station 14 and the packet-switched network 16. As a result, HTTP communications (e.g., requests for web content, and responses providing web content) will necessarily pass through the intermediation platform 60 on their way between the client station 14 and the content server 18. With this arrangement, the owner or operator of the access channel 20 can advantageously intermediate in HTTP communications to and from users of the access channel.

Alternatively, however, the intermediation platform could reside elsewhere in the HTTP communication path. If not in the access channel 20, a mechanism will preferably be provided to direct HTTP communications through the intermediation platform. For instance, the client station could be set to direct all HTTP requests to the intermediation platform as a proxy server.

In accordance with the exemplary embodiment, the intermediation platform 60 embodies intermediation trigger logic, so as to detect HTTP communications flowing between the client station 14 and the content server 18. In addition, the intermediation platform 60 may also include some or all of the intermediation enforcement logic. However, in the exemplary embodiment, the intermediation platform 60 preferably includes only a small set of enforcement logic, and the bulk of the enforcement logic is instead located at one or more central servers.

In the arrangement of FIG. 7, the one or more central servers are shown as "interstitial" servers 62, labeled as such because the servers can be employed in the middle of an intermediation process, i.e., during an HTTP communication. By way of example, the interstitial servers 62 are shown linked with intermediation platform 60 by at least a packet-switched network 64. Packet-switched network 64 may or may not be the same network as packet-switched network 16. Thus, it is possible that interstitial servers 62 might sit on the same network where content server 18 sits. In the exemplary embodiment, however, packet-switched network 64 is preferably a private or core packet-switched network operated by the carrier that supplies client station 14 with access to packet-switched network 16, i.e., the owner or operator of access channel 20.

Generally speaking, the interstitial servers 62 may carry out various intermediation enforcement functions, possibly through interaction with user 12 of client station 14. By way of example, an interstitial server might function to collect user payment for requested web content. And as another example, an interstitial server might function to obtain user approval for release of confidential user information, such as user location or user passwords for instance. Other examples are possible as well.

Figure 8:
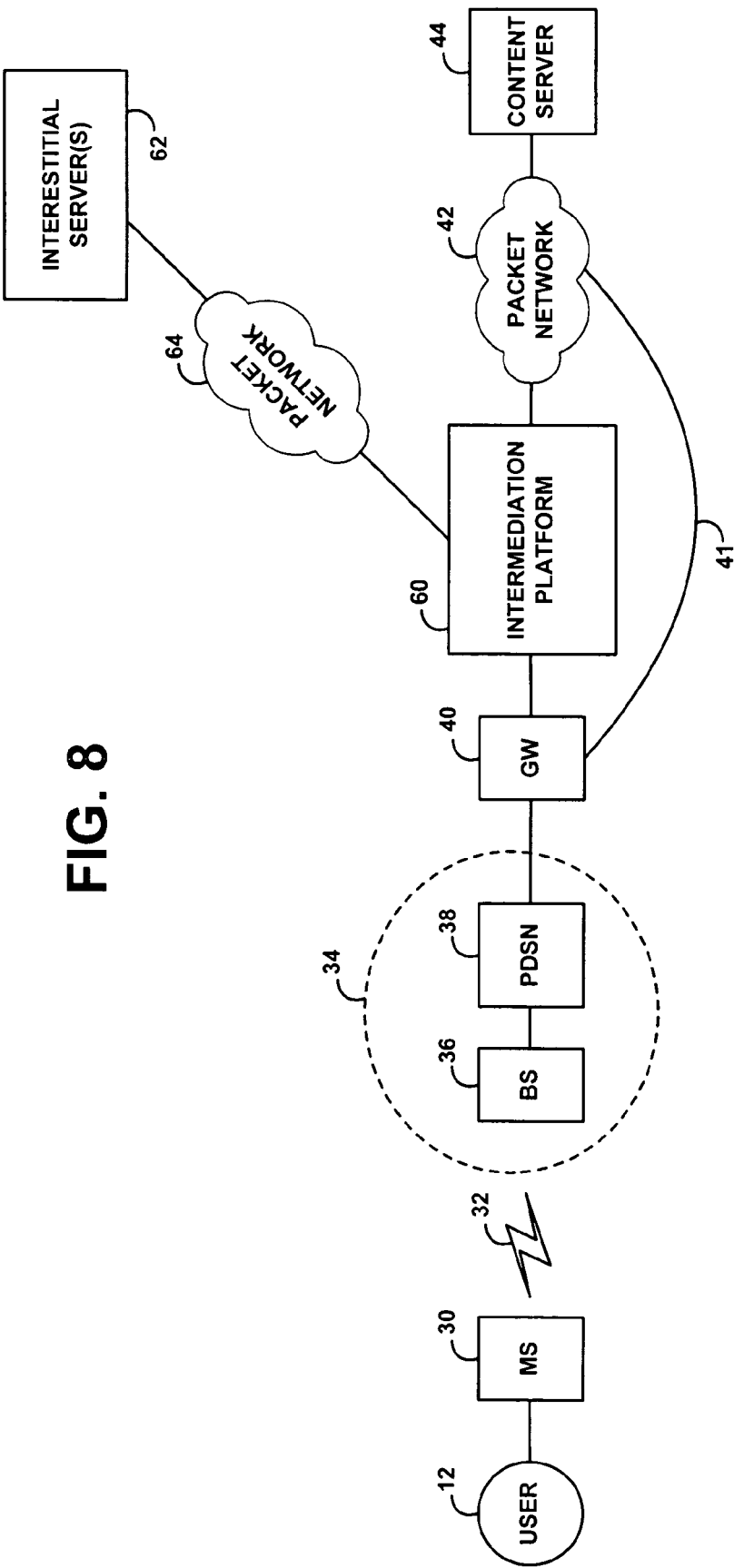
FIG. 8 is a block diagram showing placement of an intermediation system within a web communication path through a wireless communication system, in accordance with the exemplary embodiment.
Figure 9:
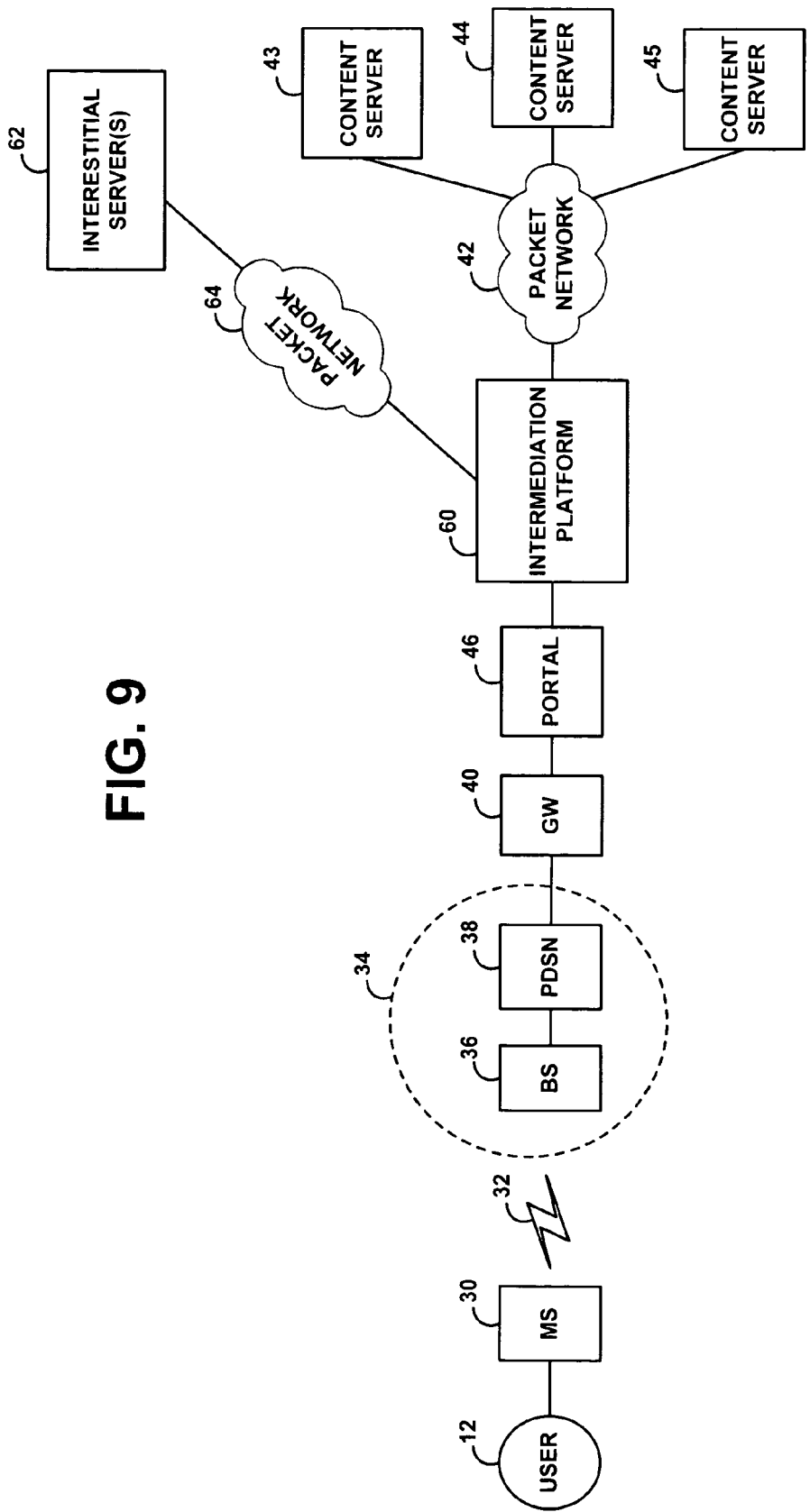
FIG. 9 is a block diagram showing placement of an intermediation system within a web communication path through a wireless communication system, including a web portal within the web communication path, in accordance with the exemplary embodiment.

The arrangement shown in FIG. 7 is generally representative of how an intermediation system can be inserted within an HTTP communication path between a client station and a content server. Referring next to FIGS. 8 and 9, some more specific arrangements are shown, in this case to illustrate one or many ways that the intermediation system could be implemented within a wireless communication system such as those shown in FIGS. 4 and 5 for instance. Similar arrangements could also be established in other systems, whether landline or wireless.

FIG. 8 is a variation on the more specific arrangement of FIG. 4. In FIG. 8, as in FIG. 4, the client station is a mobile station 30 that communicates over an air interface 32 and a radio access network 34, the content server 44 sits on a packet-switched network 42, and a gateway 40 sits between the radio access network 34 and the packet-switched network 42.

In FIG. 8, the intermediation platform 60 has then been inserted between the gateway 40 and the packet-switched network 42, so that the intermediation platform 60 sits within the HTTP communication path between the mobile station 30 and the content server 44. (Note that gateway 40 may also have a more direct connection 41 to the packet-switched network 42.) Additionally, the intermediation platform 60 is then shown linked with a core packet network 64, which may be owned and operated by the wireless carrier. And interstitial servers 62 are shown as nodes on the core packet network 64.

As one of many example variations from this arrangement, note that gateway 40 and intermediation platform 60 could themselves sit on core packet network 64. In that arrangement, the radio access network (and particularly PDSN 38) could be arranged to route outgoing traffic to gateway 40, and gateway 40 could in turn be arranged to route the traffic to the intermediation platform 60. The intermediation platform can then be arranged to route the traffic along its way, and/or to invoke or carry out an intermediation function. Similarly, incoming traffic can flow from the packet-switched network 42 to the intermediation platform 60, to the gateway 40 and to the radio access network, for transmission to the mobile station 30. Thus, with this variation, the intermediation platform would still sit within the HTTP communication path between the mobile station 30 and the content server 44.

Further, note that some of the functions of intermediation platform 60 and gateway 40 could be combined together on a common platform or could be allocated to the platform 60 and gateway 40 in various ways. For instance, the intermediation platform could perform some functions that would otherwise be performed by the gateway. And the gateway could perform some functions that would otherwise be performed by the intermediation platform.

(Still further, note that under normal circumstances, gateway 40 might cache premium web content to facilitate quicker delivery of the content to client stations such as mobile station 30. In the exemplary embodiment, the gateway would be arranged to not do so, unless the gateway functions as the intermediation platform. (Otherwise, HTTP requests for such content would normally not pass to the intermediation platform). For instance, when the intermediation platform 60 passes web content via gateway 40 to the client station, the intermediation platform could instruct the gateway to not cache the content.)

FIG. 9, in turn, is a variation on the arrangement shown in FIG. 5. In FIG. 9, as in FIG. 5, a web portal 46 has been added between the gateway 40 and the packet-switched network 42 on which the content server 44 sits. In FIG. 9, the intermediation platform 60 has then been inserted between the portal 46 and the packet-switched network 42, so the intermediation platform 60 sits within the HTTP communication path between the mobile station 30 and the content server 44. (That is, a request for web content, passed from the mobile station 30 to the portal 46 and from the portal 46 to the content server 44, will pass through the intermediation platform 60 on its way from the portal 46 to the content server 44. And requested web content provided by the content server 44 will pass through the intermediation platform 60 on its way from the content server 44 to the portal 46, for delivery of the content in turn to the mobile station 30.)

Additionally, the intermediation platform 60 is then shown linked with a core packet network 64, which may be owned and operated by the wireless carrier. And interstitial servers 62 then sit as nodes on the core packet network 64.

As with FIG. 8, one of many possible variations in the arrangement of FIG. 9 is that the gateway 40 and portal 46 could instead sit on core packet network 64. Additionally, the intermediation platform 60 could also sit on core packet network 64. And HTTP communications could flow through the core packet network and, particularly, through the intermediation platform 60, on their way between the mobile station 30 and the content servers 43, 44, 45.

It should be understood that numerous other arrangements and variations are possible as well. For example, referring to FIGS. 8 and 9, the intermediation platform 60 could instead be inserted in front of the portal 46 (to the left of the portal in the figure). And as another example, the intermediation platform 60 could be integrated as part of the gateway 40 or as part of the portal 46. And as still another example, the intermediation platform 60 could be inserted elsewhere within the HTTP communication path between the client station and content server, such as elsewhere on one or more packet-switched networks between the endpoints, for instance. (For instance, the intermediation platform could reside in an access channel to the content server, so as to maintain control over HTTP communications with that content server.) Further, multiple intermediation platforms 60 could be provided in a single HTTP communication path. For instance, one intermediation platform 60 could be provided for intermediating HTTP requests, and a separate intermediation platform 60 could be provided for intermediating HTTP responses. Still other variations are possible as well.

b. Exemplary Intermediation Platform

Figure 10:
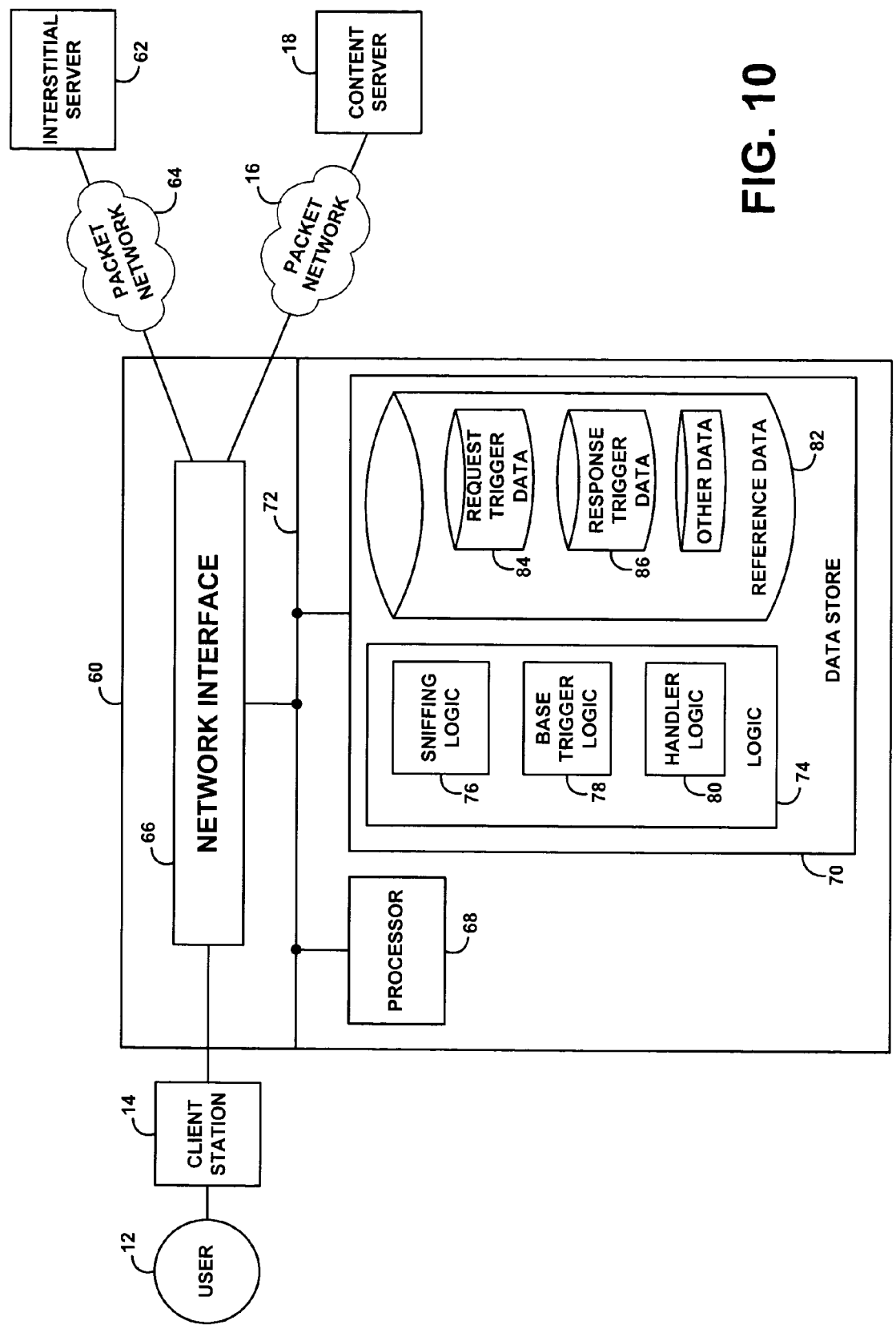
FIG. 10 is a block diagram of an exemplary intermediation platform.

Referring now to FIG. 10, a functional block diagram of an exemplary intermediation platform 60 is shown. The figure depicts the intermediation platform 60 in the context of the arrangement shown in FIG. 7 and uses the same reference numerals as used in that figure. Thus, the platform 60 sits in the HTTP communication path between a client station 14 and a content server 18, and the platform further has access to an interstitial server 62.

As illustrated in FIG. 10, the exemplary intermediation platform 60 includes a network interface 66, a processor 68, and data storage 70, all of which may be linked together by a system bus, a hub, a network, or some other mechanism 72. Generally speaking, the network interface 66 receives and sends IP packets that carry HTTP communications. And the processor 68 executes logic stored in data storage 70 in order to facilitate intermediation in response to those HTTP communications.

In the exemplary embodiment, data storage 70 preferably includes a set program logic 74 (e.g., machine language instructions), which the processor 68 can execute in order carry out various functions described herein. As shown in FIG. 10, the program logic 74 may include (i) detection or "sniffing" logic 76, (ii) base trigger logic 78 and (iii) handler logic modules 80, each of which could be loaded onto the platform or modified as desired, in order to provide a desired set of functionality.

The sniffing logic 76 is executable by the processor 68 to detect and extract HTTP messages (or, more generally, web communications) received by network interface 66. Thus, as IP packets enter network interface 66, the processor may apply sniffing logic 76 to determine whether the packets carry an HTTP message (as indicated by the port number (e.g., port 80) set forth in the packet headers, for instance). If so, the processor temporarily pauses transmission of the IP packet(s) that carry the HTTP message (i.e., temporarily pauses the HTTP communication), and the processor extracts the HTTP message and passes it in a function call to the base trigger logic 78.

The base trigger logic 78, in turn, is executable by the processor 68 to determine whether intermediation action should be taken in response to the HTTP message and, if so, to call one or more of the handler logic modules 80. The handler logic modules 80 are then executable by the processor to perform various intermediation functions, such as calling out to an interstitial server 62 and/or modifying HTTP messages.

In addition, data storage 70 preferably includes a set of local reference data 82, which the processor 68 can reference when executing logic 74, so as to facilitate various intermediation functions. In the exemplary embodiment, the reference data 82 may include tables of data (or other forms of data) that indicate what, if any, action(s) to take in response to particular HTTP messages. For example, the reference data 82 may correlate particular HTTP messages (by URI pattern, for instance) with one or more of the handler logic modules 80.

Base trigger logic 78 may thus refer to the reference data 82 in order to determine whether to call a particular handler module in response to a given HTTP message, or whether to simply allow the HTTP message to pass along its way without intermediation. In this regard, the reference data 82 may include (i) request trigger data 84, which specifies which, if any, handler module(s) to call in response to various HTTP request messages, and (ii) response trigger data 84, which specifies which, if any, handler module(s) to call in response to various HTTP response messages.

According to the exemplary embodiment, the request trigger data 84 can include (i) a whitelist table, (ii) a URI-pattern table and (iii) one or more exception tables (possibly keyed to action type, username or other variable). Alternatively, the request trigger data 84 could take some other form.

An exemplary whitelist table will list the domains of web hosts as to which intermediation might be performed. If intermediation platform 60 is programmed to intermediate HTTP requests that are directed to a given domain (such as "sprintpcs.com," for instance), the whitelist will preferably list that domain as one of those eligible for intermediation. Whereas, if the platform is not programmed to intermediate HTTP requests from another given domain, the whitelist will preferably not list that other domain.

In this regard, in order to determine the domain name to which a given HTTP request is destined, the intermediation platform could analyze the packet(s) that carry the request. For instance, the platform could read the domain name from the URI set out in the packet payload. Alternatively, the platform could read the IP address to which the packet(s) are destined and could then perform a reverse domain name lookup (e.g., by querying a domain name server (DNS)), to determine the corresponding domain name.

An exemplary URI-pattern table, in turn, will list request-URIs or request-URI patterns (e.g., with wildcards, as a regular expression for instance) as to which intermediation should be performed. Further, the URI-pattern table will specify one or more actions that platform 60 should take in response to an HTTP request directed to that URI. By way of example, for each URI as to which the platform is to perform intermediation, the URI-pattern table may include a record that specifies one or more of the handler logic modules 80 that should be invoked. (Where multiple actions are specified, there could be a defined order of carrying out the actions. Further, there could be coalescence between multiple actions, such as asking a user for a password just once even if each of multiple actions would normally require prompting for the password.) For instance, each record of the exemplary URI-pattern table may include a URI-pattern field, which specifies a URI-pattern, and an Action field, which lists the name(s) of the handler logic module(s) to run.

An exception table may then provide for exceptions to intermediation. By way of example, if the intermediation function is to ensure user payment for web content before the web content is sent to client station 14, an exception table might specify that a particular user has already paid for the content, so that no intermediation is required for that user. Other examples are also possible. And note also that some or all of these reference tables could be maintained elsewhere and queried as appropriate by the intermediation platform 60.

Thus, in exemplary operation, the processor 68 will consider an HTTP request, to determine whether intermediation should be performed in response to the request. If the target domain referenced in an HTTP request message is listed in the whitelist table, the request-URI matches an entry in the URI-pattern table, and no exception precludes intermediation, then the processor may call one or more handler logic modules 80 designated by the URI-pattern table. Otherwise, the processor may simply send the HTTP request, via network interface 66, along its way to the content server 18.

In this regard, as noted above with reference to FIG. 8, a gateway between the client station and the intermediation platform could be arranged to carry out some functions that would otherwise be carried out by the intermediation platform. Whitelisting is an example of one such function. In particular, upon receipt of an HTTP request from a client station, the gateway could consult a whitelist table so as to determine initially whether the HTTP request should be intermediated. If so, the gateway could send the HTTP request to the intermediation platform. And if not, the gateway could send the HTTP request more directly to the packet network 16 for transmission to the content server, bypassing the intermediation platform.

Further, as also noted above, the gateway could function to insert a user ID into an HTTP request. In the exemplary embodiment, if the gateway sends an HTTP request to the intermediation platform, the gateway could send a plaintext version of the user ID to the platform. The platform could then encrypt the user ID before sending the request along to the content server. Alternatively, if the gateway sends an HTTP request more directly to the packet network 16, the gateway itself could encrypt the user ID before sending the request along its way.

Similarly, according to the exemplary embodiment, the response trigger data 86 may include a whitelist table and a URI-pattern table, so as to trigger intermediation when an HTTP response message comes from a specific domain and, more particularly, from a specific URI. As a general matter, the whitelist table and URI-pattern table on the response side could function in the same manner as those described above for HTTP requests (and could be integrated with those tables, such as by having columns respectively for request processing and response processing).

Thus, if the intermediation system is set to perform intermediation on HTTP responses from a given domain, then the whitelist table may list that domain. And if the intermediation system is set to perform intermediation in response to HTTP responses from a given URI (or URI pattern), then the URI-pattern table may list that URI (or URI pattern) and may point to one or more of the handler logic modules 80 that should be invoked in order to carry out the intermediation.

Note that the domain and URI may be indicated as header parameters in the HTTP response, or the intermediation platform 60 may have a record (expressly or implicitly) of those parameters if the platform 60 opened its own TCP socket with the content server. Still alternatively, a content server that is arranged to facilitate intermediation could include domain and URI indications (expressly, or as representative codes) in any predefined position in an HTTP response, so as to provide the information to the intermediation platform 60; the intermediation platform 60 may then be programmed to detect those indications so as to identify message origin.

Additionally, or alternatively, the response trigger data 86 in an exemplary embodiment could include a markup-pattern table. As presently contemplated, the markup-pattern table can be akin to the URI-pattern table. However, rather than (or in addition to) triggering response intermediation based on URI-pattern, the markup-pattern table can trigger intermediation based on particular elements of markup language within the web content that the content server 18 has provided in the HTTP response message. Examples of such markup language elements include specific tags, specific tag/value pairs, and combinations of these or other elements, whether or not the elements are set forth in comments or as language intended to be interpreted by the browser on the client station 14. (Further, as with URI-patterns as described above, a markup-pattern could be specified as a regular expression, with wildcards for instance.)

Thus, each record of an exemplary markup-pattern table might include (i) a markup-pattern field, which specifies one or more elements of markup language, and (ii) an Action field, which points to one or more handler logic modules 80 to call when that markup-pattern appears in an HTTP response. Further, the Action field, or one or more other fields could specify additional parameters to use in carrying out intermediation. And still further, each record of the exemplary markup-pattern table could also be keyed to a particular domain and/or particular URI (or URI pattern), so as to restrict markup-based intermediation to HTTP responses from that particular domain and/or that particular URI.

Note that variations on the foregoing triggering mechanisms, and other triggering mechanisms altogether, are also possible on both the request side and the response side. For example, logic 74 could be arranged to trigger intermediation based on other fields in an HTTP request or response message, or based on external factors, such as time/date, or current network conditions. And as another example, logic 74 could be arranged to trigger intermediation for all HTTP messages if desired. Other examples are possible as well.

Further, it should be understood that intermediation platform 60 can take other forms as well. For instance, network interface 66 itself could comprise a processor that sniffs packets and identifies HTTP messages. As such, the network interface could be a programmable level-7 content switch or a programmable HTTP proxy. The network interface could then also be programmed to apply the base trigger logic and even the handler logic. Or the network interface could be tied to an application server and/or database server that carries out those other functions. Thus, for instance, when the network interface detects an HTTP message, it could pass the message to the application and/or database server for further processing. Other variations are also possible.

c. Interstitial Communication

With the benefit of the exemplary embodiment, an intermediation system may perform a variety of useful intermediation functions when it detects an HTTP message passing between a client station 14 and content server 18. According to the exemplary embodiment, one of those functions could be engaging in "interstitial communication" with the client station (and, more specifically, with the user 12). In particular, the intermediation system may pause the HTTP communication between the client station 14 and content server 18 and instead, itself (or through some agent), communicate with the client station 14.

The intermediation system can carry out interstitial communication in various ways, applying a suitable set of interstitial communication logic. Preferably, but only by way of example, the intermediation system could itself engage in HTTP communication with the client station 14. This process will work particularly well, because the browser on client station 14 is waiting for an HTTP response to an HTTP request that it has sent to the content server (or to a portal or proxy that gets content from the content server).

Within the intermediation system, the intermediation platform 60 may itself engage in interstitial communication with the client station 14. (For instance, a handler logic module 80, when invoked, may send an interstitial HTTP response to the client station 14). However, according to the exemplary embodiment, the bulk of the interstitial communication function will instead be offloaded to interstitial server(s) 62.

This interstitial communication can occur in many different ways. As one example, for instance, after the platform 60 receives an HTTP request originally from client station 14 and determines that intermediation action should be taken, a handler logic module 80 may open a TCP socket with the interstitial server 62 and send an HTTP request to interstitial server 62, providing the interstitial server with the user's original HTTP request, and invoking a designated logic module or object on interstitial server 62 to process the user's HTTP request.

Interstitial server 62 may then responsively analyze the user's HTTP request and, by reference to user profile data and/or other reference data, may generate or select an appropriate "interstitial screen" to send to the client station 14. In this regard, as used herein, the term "interstitial screen" refers to web content that is to be provided interstitially to client station 14.

In the exemplary embodiment, the interstitial server 62 may include in the interstitial screen a hyperlink (e.g., button or text link, generally an HREF) that points to the interstitial server 62 (hereafter an "interstitial hyperlink"). That way, when the browser on client station 14 presents the interstitial screen to the user 12, the user can respond to the interstitial server 62 by clicking on the hyperlink. Further, the interstitial server 62 may advantageously set forth the user's original HTTP request as a query parameter (or in some other manner) in the interstitial hyperlink, in order to preserve the user's original HTTP request.

The interstitial server 62 may then send the interstitial screen in a 200 OK response to the handler logic module 80 on the intermediation platform 80. And, upon receipt of that response, the handler logic module 80 may extract the interstitial screen (i.e., the markup language carried in the 200 OK response) from the response and insert it into a new 200 OK message to the client station 14. The handler logic module 80 may then send the new 200 OK message, via network interface 66, to the client station 14.

Upon receipt of the 200 OK response, a web browser on client station 14 may then display the interstitial screen to user 12. In turn, the user may click on the interstitial hyperlink to reply to the interstitial server. As a result, the web browser will send a new GET request to the interstitial server. Alternatively, if the user and/or client station provides data in response interstitial screen (such as by filling in form fields in the screen), the web browser might instead send an HTTP "POST" request to the interstitial server. In any event, the new HTTP request that the web browser sends to the interstitial server will preferably carry as a query parameter the user's original HTTP request, as noted above.

As the new HTTP request is passing between the client station 14 and the interstitial sever 62, the intermediation platform 60 will detect the request. Noting the URI of the interstitial server, a handler logic module 80 on the intermediation platform 60 may then open a new TCP socket with the interstitial server 62 and send an HTTP request through that socket to the interstitial server 62, providing the interstitial server with the client's new HTTP request. And again, the interstitial server 62 may then respond to the client station 14 in the same manner.

This back and forth communication between the interstitial server 62 and the client station 14 can continue as long as necessary, preferably preserving the user's original HTTP request the whole time. (Alternatively, the intermediation platform 60 or interstitial server 62 could maintain a record of the user's original HTTP request and could tie that record together with the interstitial communication. For instance, the interstitial server 62 could correlate the request and interstitial communication with a unique communication (or interstitial conversation) identifier or key.)

Once the interstitial server 62 has completed its interstitial communication with the client station 14, the interstitial server 62 may signal to the intermediation platform 60 to send the user's original HTTP request along its way to content server 18. To do this, in the exemplary embodiment, the interstitial server 62 may return a 200 OK response to the handler logic module 80, providing the user's original HTTP request as the return data. When the handler logic module 80 receives that 200 OK response, the handler logic module 80 may detect the HTTP request as the return data and may responsively send the HTTP request, via network interface 66, to the content server 18. (Note that the intermediation system could also modify the user's original HTTP request in some manner before sending it along its way to the content server 18.)

Alternatively, the interstitial server could itself pass the original request along to content server 18. Upon receipt of a response from content server 18, the interstitial server could then pass that response along to the client station.

It should be understood that the communication mechanism between the intermediation platform 60 and the interstitial server 62 could take forms other than that described above. For instance, the platform and server could communicate by remote method invocation (RMI) or remote procedure call (RPC). Or, as noted above, the platform and server could be integrated on a common server, so that remote communication does not take place.

Further, a mechanism like that described above could be used as well to carry out interstitial communication triggered by an HTTP response rather than by an HTTP request. For instance, when the intermediation system receives an HTTP response, the intermediation could signal to the interstitial server 62, and the interstitial server could generate and return an interstitial screen, which the intermediation system could then send to the client station. The interstitial screen can prompt a user to respond and could direct any response to the interstitial server 62. In the manner described above, communication could thus pass back and forth between the interstitial server and the client station.

Upon conclusion of communication between the interstitial server and the client station, the interstitial server could then signal to the intermediation system, to cause the intermediation system to send the original HTTP response along to the client station (or to not send the response, if appropriate).

d. Embellishing Web Content

Another useful function that the intermediation system could perform is to embellish web content that is being sent from a content server to a client station. In particular, when the intermediation system receives an HTTP response from the content server, the intermediation system can add one or more explanatory objects into the web content before sending the HTTP response along its way to the client station. When the client station receives the HTTP response, the web browser will then display, or otherwise present, the explanatory object(s) along with the underlying web content provided by the content server.

The intermediation system can add an explanatory object into the web content by modifying the markup language to include the explanatory object or by modifying the markup language to include a reference to the explanatory object. A reference to the explanatory object could point to the object on a server remote from the client station. In that case, the browser would separately load the object from the server and present the object together with the underlying web content. Or the reference could point to the object stored locally on the client station. In that case, the browser could load the object from storage on the client station and present it with the underlying web content (or contemporaneously in another browser window).

(Note that the "explanatory object" is an object that the client station will present to a user as part of the underlying web content. This is to be distinguished from some other sort of object (e.g., a comment that a browser would generally disregard) that the client station will not present to a user as part of the underlying web content. For this reason, the term "explanatory presentation object" can be used interchangeably with the term "explanatory object.")

The explanatory object can be embodied in various forms. By way of example, and without limitation, the explanatory object could be embodied in (i) display text, which the browser would display as text in the web page, (ii) a graphic, which the browser would display graphically in the web page, or (iii) a sound, video and/or other media clip, which the browser might play out to the user while presenting the web page. Further, the object could be presented in a frame of a browser window (e.g., in a footer or margin) rather than within the web page being displayed in the window. Still further, the object could be hidden in the web page until the user takes an action, such as rolling a mouse over the object or over some other object that triggers the explanatory object to be presented (e.g., as a pop-up display or media presentation), or until another event occurs. The explanatory object could take other forms as well.

The intermediation system can strategically place the explanatory object into the web content so that the explanatory object will be presented in conjunction with a particular aspect of the underlying web content, thereby giving the user an explanation about that aspect of the web content. By way of example, and without limitation, if the explanatory object is a visual object (e.g., text or graphic) the system could insert the object just before, after, above or below the aspect to be explained, or otherwise nearby or logically associated with the aspect to be explained. Alternatively, the system can cause the explanatory object to be presented at some other position or in some other manner.

Through use of this technique, the intermediation system can advantageously explain to the user what will happen when the user clicks on (or otherwise invokes) a given hyperlink in the web page. For example, the explanatory object can advise the user where the user will be taken when the use clicks on the link, or how much the user will be charged or asked to pay for the referenced content when the user clicks on the link. In this regard, the explanatory object can advise the user that the user will be taken to an interstitial web site when the user clicks on the link (i.e., that the link will cause the browser to load an interstitial screen). For that purpose, the explanatory object might be a predefined graphic indicative of the intermediation system.

To facilitate embellishment of web content, the exemplary intermediation system described above could include an embellishment handler module (also referred to as "embellishment logic"), among handler logic modules 80. The embellishment handler module could be executable by the processor 68 to modify markup language in an HTTP response, so as to add into the markup language a designated explanatory object (and perhaps to otherwise modify the markup language, if desired).

In turn, the URI-pattern table and/or the markup-pattern table in the reference trigger data 86 could point to that embellishment handler module and could specify a particular explanatory object to be inserted when the HTTP response originates from a particular URI and/or contains a particular markup-pattern. The particular explanatory object could be a predefined object, or it could be dynamically generated.

For instance, with respect to a given hyperlink within the HTTP response, the reference trigger data could define as the explanatory object a predefined cost to access the content. Alternatively, the reference trigger data could define the explanatory object by reference to a function that dynamically establishes the explanatory object based on context (such as time of day, or size of the referenced content, for instance.)

Further, on the response side, just as on the request side, the intermediation system could reference a whitelist table, which indicates generally whether the HTTP response is to be embellished or otherwise intermediated. If the system determines that some intermediation action is to be taken, then the system could proceed to consider the URI-pattern table and/or markup-pattern table to determine whether to execute the embellishment handler module.

3. Managing Payment for Web Content

For many years, much of the content available on the World Wide Web was free for any authorized web user to access. The owners and operators of content servers (hereafter "content providers") relied in large part on advertising revenues, selling ad space such as "banner ads" on their web pages. In recent years, however, operation costs have pushed more and more content providers to begin charging for access to their web content.

In order for a content provider to charge users for access to its web content, the content provider generally employs a mechanism to collect payment from users, or to track prepaid use-licenses where users have paid in advance for a certain timeframe or quantity of access. This process can be burdensome and costly for many content providers.

The exemplary embodiment provides a mechanism to facilitate management of user payment, or at least management of user payment for content provided by a content provider. (Note that the intermediation system could be owned and operated by the content provider as well (in which case, the billing is done both by and on behalf of the content provider.)) Namely, an exemplary intermediation system such as that described above could be used to advise a user how much the user will pay or be asked to pay when the user seeks to access to given web content. Further the intermediation system could be used to collect payment from a user, or to receive the user's agreement to pay or to be billed.

In accordance with the exemplary embodiment, the intermediation system will compute a cost to access given web content based at least in part on the size of the web content, such as the number of bits, bytes, characters or other units of data that make up the web content. For instance, the intermediation system could determine the size of the web content and then multiply the size by a charging rate, which could vary based on user, time/day, content provider or other factors. The intermediation system will then advise the user of the size-based access-cost.

a. Pre-Nonrepudiation

When an intermediation system provider ("intermediary") such as a carrier bills a user for content (or services) delivered by a content provider, the intermediary should be able to prove that the user agreed to pay for the content. If an intermediary cannot prove that the user agreed to pay for the content, then the user might repudiate the charge. Therefore, the process of proving that a user agreed to pay for a charge may be referred to as "non-repudiation."

With the exemplary embodiment, an intermediation system can advantageously be used to perform non-repudiation before a user even requests web content. To do so, the intermediation system can embellish a web page that contains a link to the web content, by adding, in connection with the link, an indication of the price that a user will be expected to pay for the web content if the user selects the link. Thus, before the user even requests the web content, the user will have notice of how much the web content will cost.

This process can be referred to as "pre-nonrepudiation," since it is a mechanism that helps to secure a user's agreement to pay for content before, or at the time, the user clicks on a hyperlink. At a minimum, it functions to support an argument that a user who clicks on the link knew how much the content would cost. By performing this function in an intermediation system, the intermediary can thus better prove that users incurred various costs, and the intermediary can thus better recoup costs from the content provider.

To carry out this function in accordance with the exemplary embodiment, the intermediation system can be arranged to (i) detect a hyperlink in web content being delivered to a client station, (ii) determine a size of the web content referenced by the hyperlink, (iii) compute a size-based cost for accessing the referenced web content and (iv) embellish the web content being delivered to the client station, so as to indicate the size-based cost for accessing the referenced web content.

The process of detecting a hyperlink in web content and then embellishing the web content to indicate cost to access the referenced content can be carried out in the manner described above. For instance, the markup-pattern table of the intermediation system could include a record for each hyperlink at issue, and the Action field of each record could recite a function call to the embellishment handler routine to cause a cost-indication to be added in connection with the hyperlink.

Further, one of the handler logic modules 80 could be a cost-computation handler routine that functions to (i) receive a size of web content, (ii) multiply the size by a designated charging rate, and (iii) return a value indicating the size-based cost to access the web content.

The cost-computation handler routine could take into consideration other factors in addition to size as well. For instance, the routine could apply different charging rates depending on various factors, such as user service level or time of day. By way of example, the intermediation system might maintain or have access to user profile data that indicates user service levels, as well as charging-rate data that indicates charging rates per service levels. Given a user-ID in the web communication (typically carried in an HTTP request), the system may then query the profile store to determine the service level of the requesting user. And the system may then select and apply a charging rate that corresponds to that service level.

Upon detecting a given hyperlink, the intermediation system could determine the size of the referenced web content in various ways. By way of example, for each hyperlink in the markup-pattern table, the markup-pattern table could list a size of the content that is referenced by the hyperlink, and so the intermediation system could simply read the size from there. In this regard, the system could periodically update the size indications in the markup-pattern table by (i) caching the referenced content and measuring file sizes or (ii) querying the respective content providers for size per hyperlinked content. Thus, the size of content referenced by a given hyperlink could be a last-known size.

As another example, the size of referenced content could be indicated (e.g., by the content provider) within specially marked comments or other language within the HTTP response. For instance, the HTTP response that the content provider sends could indicate the size of referenced web content by an attribute tag set forth in conjunction with the hyperlink itself, such as:

<A HREF="http . . . " ContentSize="14"></A>
(where "http . . . " would be a full URL of referenced web content, and where "ContentSize" may represent the size of the referenced web content in kilobytes or in some other predefined unit.)

When the intermediation system calls the embellishment handler routine, the intermediation system could pass a size-based access-cost as the explanatory object to be added into the web content in conjunction with the hyperlink. For instance, the intermediation system could call the embellishment handler routine and pass, as an argument, a size-based cost that the cost-computation routine has computed.

To illustrate more specifically, consider a scenario where the content provider is a news magazine company, and, through content server 18, the magazine company offers electronic copies of articles that have appeared in past issues. Thus, content server 18 may host an article-listing web page that lists available articles and that links each listing to an HTML copy of the respective article. Assume further, that the magazine company has contracted with the intermediation-system provider to bill users on behalf of the magazine company, for access to those articles. (Alternatively, the magazine company might own, operate or otherwise control the intermediation system itself.)

In this scenario, the intermediation system might include, in its reference trigger data 86, a listing of hyperlinks that could appear in the magazine company's web page and, for each hyperlink, an indication that a size-based cost should be added in conjunction with the hyperlink. For instance, the markup-pattern table might include a number of records, each keyed to the URI of the article-listing web page, and each then specifying the "HREF" markup language that would define one of the article hyperlinks set forth on that page, as well as a size of the referenced file (e.g., a last-known size). In the action field of each record, the table could then recite a function call to the embellishment handler routine and, within that function call, could recite a function call to a cost-computation routine.

In operation, when the intermediation platform 60 receives an HTTP response from the content server 18, processor 68 may search the markup-pattern table for all records keyed to the URI of the article-listing web page. As a result, the processor 68 may establish a list of hyperlinks in the web page, and their corresponding sizes. As indicated by the records, the processor 68 may then call the cost-computation routine and embellishment handler routine, so as to facilitate insertion of a size-based cost adjacent to each hyperlink in the page.

Thus, when the intermediation platform sends the HTTP response along its way to the client station 14, the web content may advantageously include next to each listed article an indication of how much the article costs, where the cost is computed based at least in part on the size of the article. Conveniently, this can be done without requiring the content server 18 (or, more generally, the content provider) to be aware of pricing (such as the charging rate applied by the intermediation system) or to otherwise manage pricing at all.

FIGS. 11-15 help illustrate this process by way of example. These figures assume again that a magazine company hosts a web page that lists hyperlinks to articles available for purchase. And the figures also assume that the magazine-company has contracted with an intermediary (e.g., an access-channel provider) to have the intermediary (on behalf of the news magazine) bill users for downloading these articles. (Conveniently, the content provider can then collect payment from the intermediary, rather than individually from all of the users; and the content provider can rely on the intermediary to authorize and authenticate individual users.) Further, the figures assume that file size varies from article to article.

FIG. 11 depicts how the list of hyperlinks might normally appear on the magazine-company's web page when displayed at client station 14. (Underlining reflects a hyperlink.) FIG. 12, in turn, depicts the markup language that might underlie that list of hyperlinks. As shown, the source code underlying each link begins with an "<A HREF>" tag that points to an HTML file of an article, and each link concludes with a closing </A> tag. Before the closing tag, each link includes display text (such as "Article #1"), which a browser will display as the respective hyperlink.

In accordance with the exemplary embodiment, the response trigger data 86 in intermediation platform 60 may be provisioned so as to include listings for each of these hyperlinks and to indicate the respective sizes of each referenced article. As noted above, the sizes could be updated periodically by querying the content server or in some other way.

Thus, by way of example, FIG. 13 displays four records that might appear in the table. Each record in this example recites the opening <A HREF> tag/value as the markup pattern, specifies the size of the referenced content in bytes, and recites as the associated action a function call to ADDCOST (COSTCOMP(size)). The function COSTCOMP( ) could be the cost-computation handler routine. And the function ADDCOST( ) could be an embellishment handler routine that is executable by processor 68 to add the indicated cost into the web page in conjunction with the referenced hyperlink.

In operation, when the intermediation platform 60 receives an HTTP response that carries the news magazine's web page, processor 68 may reference the markup-pattern table and determine that the four hyperlinks are listed in the web page. For each hyperlink, the processor 68 may then execute the COSTCOMP( ) function to compute a size-based cost to access the referenced article and the ADDCOTS( ) function to embellish the hyperlink with the computed size-based cost.

FIGS. 14 and 15 illustrate what might result from this process, using a charging rate of $0.18/kilobyte for example. FIG. 14 first depicts the markup language that may result. As can be seen, in each hyperlink, the ADDCOST function has inserted the size-based cost of the referenced content parenthetically just after the closing </A> tag. And FIG. 15 then shows what the resulting web page may look like. In particular, after each hyperlink, the respective size-based cost appears parenthetically.

In the exemplary embodiment, the intermediation platform 60 may also include an exception table on the response side, to avoid performing pre-nonrepudiation for users who have already paid for content (or who are otherwise licensed to receive the content). In particular, reference data 82 could include a digital rights management (DRM) table that indicates, per user, rights that the user has already paid to receive. For instance, the DRM table could indicate that a given user, having a given username, is credited with one month worth of articles from www.newsmagazine.com. In that case, if platform 60 receives the above HTTP response and the response is destined for that user (as indicated by username field in the HTTP response (or in the associated HTTP request), for instance), then processor 68 may decline to add the price per article into the web page. For other users, however, the processor 68 may insert the cost.

b. Interstitial Billing (Charge-Advice)

According to another aspect of the exemplary embodiment, when a user clicks on a hyperlink or the client station otherwise requests web content, the intermediation system can engage in an interstitial "charge-advice" session with the user, in order to collect the user's payment or agreement to pay for the requested web content.

The intermediation system can carry this out on either the request side or the response side. On the request side, for instance, the system can receive a web request being sent from the client station to the content server and can responsively engage in a charge-advice session to collect the user's payment or agreement to pay before passing the web request along to the content server. And on the response side, the system can receive requested web content being sent from the content server to the client station and can responsively engage in a charge-advice session to collect the user's payment or agreement to pay before passing the web content along to the client station.

Preferably, the amount that the intermediation system asks the user to pay or agree to pay during the interstitial charge-advice session will be a size-based cost. Thus, the intermediation system could employ a cost-computation handler routine as described above to compute a cost for the web content, and the system may engage in interstitial communication with the user in an effort to receive the user's payment of, or agreement to pay, the size-based cost.

i. Interstitial-Billing on the Request Side

In the exemplary embodiment, the URI-pattern table will include listings for URIs as to which users are expected to pay for access. Each record in the URI table may specify a last-known size of the web content at the URI, and each record may point to an INTERSTITIAL-BILLING( ) function defined by the handler logic modules. As with the ADDCOST( ) function call described above, the INTERSTITIAL-BILLING( ) function call could include as an argument a call to the COMPCOST( ) function, so as to pass to the INTERSTITIAL-BILLING( ) routine a size-based cost for the referenced content. The INTERESTITIAL-BILLING( ) routine would then invoke an interstitial charge-advice session with the user so as to collect the user's payment of, or agreement to pay (i.e., to pay or to be billed for), the size-based cost.

FIG. 16 depicts several records of a URI-pattern table arranged in this manner, consistent with the example above. In particular, for each URI pointing to one of the magazine company's articles, the exemplary URI-pattern table lists (i) the URI, (ii) a last known size of the referenced content, and, as an associated action, a function call to INTERSTITIAL-BILLING(COMPCOST(size)).

Note that this data in the URI-pattern table could alternatively be combined with the markup-pattern table entries described above. For instance, reference data 82 could include a table that lists URIs and specifies for each URI that (i) when a web request seeks content at the URI, the system should call the INTERSTITIAL-BILLING(COMPCOST (size)) function and (ii) when a web response includes a hyperlink to the URI, the system should call the ADDCOST (COMPCOST(size)) function. FIG. 17 shows such a combination table by way of example. Note that each record in the exemplary table can have both a request-side action and a response-side action, or a given record might have only a request-side action or only a response-side action.

Further, the DRM table could function as an exception table on the request side. In particular, if a user already has rights to receive particular content, then it might be inappropriate to collect payment from the user for that content.

Thus, in exemplary operation, assume that a user causes a web browser at client station 14 to send an HTTP request for content at "www.newsmagazine.com/article0001.htm", which resides at content server 18. When the intermediation platform 60 receives the request, processor 68 may refer to the URI-pattern table to determine whether intermediation action should be taken.

Processor 68 may thereby determine that it should call the INTERSTITIAL-BILLING(COMPCOST(size)) function, passing a size value of 14, and may do so accordingly. In particular, processor 68 may first execute the COMPCOST (size) function to compute a size-based cost for the user to access the referenced article, and processor 68 may then execute the INTERSTITIAL-BILLING( ) function, passing that size-based cost as the amount that the system should ask the user to pay or agree to pay.

Executing the INTERSTITIAL-BILLING( ) function, processor 68 may signal out to interstitial server 62, such as by sending an HTTP request carrying the user's original GET request, as described above, and carrying the computed size-based cost. In turn, interstitial server 62 may send an interstitial charge advice screen to client station 14, requesting the user's payment or agreement to pay or be billed. The user may pay, for instance, by entering credit card information into the charge advice screen and clicking a link back to the interstitial server 62, in which case the web browser would then send an HTTP request to the interstitial server, providing the user's credit card information. The interstitial server 62 may then validate the credit card information, record the charge in a billing system, and then signal to the intermediation platform 60 to send the user's original GET request along to the content server 18. The interstitial platform may then do so, completing execution of the INTERSTITIAL-BILLING( ) function.

It should be understood that the interstitial billing function can take many other forms as well. For example, rather than signaling out to an interstitial server 62, the intermediation platform itself could communicate with the user to collect payment or to collect an agreement to pay. As another example, rather than or in addition to collecting payment, the intermediation system could collect from the user the user's agreement to be billed by the intermediary on behalf of the content server. Still other examples are possible as well.

ii. Interstitial-Billing on the Response Side

To trigger interstitial-billing on the response side, response trigger data 86 could associate a given URI with the INTERSTITIAL-BILLING(COMPCOST(size)) function call. For instance, the URI-pattern table could operate on the response side just as well as it does on the request side.

Thus, when the system receives an HTTP response providing content from that URI, the system could pause transmission of the response and may engage in interstitial communication with the user so as to collect the user's payment or an agreement to pay. After collecting the user's payment or agreement to pay, the system may then send the HTTP response along to the client station, for presentation of the requested content to the user.

As on the request side, the intermediation system could have data that indicates a last known size of the web content at issue. Alternatively, since the content is being passed through the intermediation system on its way from the content server to the client station, the intermediation system could simply look to the content to determine its size. The system could then pass that actual file size to the cost-computation routine, to facilitate computation of a size-based cost to access the web content.

4. Conclusion

An exemplary embodiment of the present invention has been described above. Those skilled in the art will understand, however, that changes and modifications may be made to this embodiment without departing from the true scope and spirit of the present invention, which is defined by the claims.

For instance, although the foregoing description focuses on HTTP signaling, many of the aspects described can be extended to apply with other signaling, such as FTP, SIP, RTP, or the like. Other exemplary variations are possible as well.

What is claimed is:

1. In a communication system wherein web content is transmitted over a communication path from a content server to a client station in response to a request from the client station, a method carried out while the web content is in transit from the content server to the client station and has thus left the content server but has not yet arrived at the client station, the method comprising the following functions:

receiving the web content at an intermediation system in the communication path;

the intermediation system computing a size-based cost to access the received web content;

the intermediation system engaging in interstitial communication with the client station to receive user approval to pay the computed size-based cost; and after receiving the user approval, the intermediation system sending the web content along the communication path to the client station, wherein the communication path extends from the content server, over a packet-switched network, and through an access channel to the client station, and wherein the intermediation system is within the access channel.

2. The method of claim 1, further comprising:

engaging in interstitial communication with the user, to collect user-payment of the size-based cost for the web content.

3. The method of claim 1, wherein computing the size-based cost to access the web content comprises:

multiplying a charging-rate by a size of the web content.

4. The method of claim 3, wherein computing the size-based cost to access the web content further comprises:

selecting the charging rate based at least in part on a factor selected from the group consisting of (i) a service level of a user requesting the web content and (ii) a time of day.

5. In a communication system wherein web content is transmitted over a communication path from a content server to a client station in response to a request from the client station, a method carried out while the web content is in transit from the content server to the client station and has thus left the content server but has not yet arrived at the client station, the method comprising the following functions:

receiving the web content at an intermediation system in the communication path;

the intermediation system computing a size-based cost to access the received web content;

the intermediation system engaging in interstitial communication with the client station to receive user approval to pay the computed size-based cost; and after receiving the user approval, the intermediation system sending the web content along the communication path to the client station, wherein the communication path comprises an access channel between the client station and a packet-switched network, the method comprising carrying out the functions within the access channel.

6. The method of claim 5, further comprising:

engaging in interstitial communication with the user, to collect user-payment of the size-based cost for the web content.

7. The method of claim 5, wherein computing the size-based cost to access the web content comprises:

multiplying a charging-rate by a size of the web content.

8. The method of claim 7, wherein computing the size-based cost to access the web content further comprises:

selecting the charging rate based at least in part on a factor selected from the group consisting of (i) a service level of a user requesting the web content and (ii) a time of day.

* * * * *